(12) United States Patent
Motoyama et al.

(10) Patent No.: US 12,105,641 B2
(45) Date of Patent: Oct. 1, 2024

(54) ELECTRONIC DEVICE

(71) Applicant: Kioxia Corporation, Tokyo (JP)

(72) Inventors: Masahiko Motoyama, Oyama Tochigi (JP); Hisaya Miyamoto, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 377 days.

(21) Appl. No.: 17/462,935

(22) Filed: Aug. 31, 2021

(65) Prior Publication Data

US 2022/0171715 A1 Jun. 2, 2022

(30) Foreign Application Priority Data

Nov. 27, 2020 (JP) .................................. 2020-196444

(51) Int. Cl.
*G06F 12/14* (2006.01)
*H04L 9/08* (2006.01)
*H04L 9/32* (2006.01)

(52) U.S. Cl.
CPC ...... *G06F 12/1408* (2013.01); *G06F 12/1425* (2013.01); *H04L 9/0869* (2013.01); *H04L 9/3242* (2013.01); *H04L 9/3247* (2013.01); *G06F 2212/1052* (2013.01)

(58) Field of Classification Search
CPC ............. G06F 12/1408; G06F 12/1425; H04L 9/0869; H04L 9/3247; H04L 9/3242
See application file for complete search history.

(56) References Cited

U.S. PATENT DOCUMENTS

| 8,966,176 | B2 | 2/2015 | Duzly et al. |
| 9,076,019 | B2 | 7/2015 | Gueron et al. |
| 2006/0107047 | A1* | 5/2006 | Bar-El ............. G11B 20/00753 713/168 |
| 2011/0185435 | A1* | 7/2011 | Chang ..................... G06F 12/14 711/E12.091 |
| 2011/0296088 | A1* | 12/2011 | Duzly ................ G06F 12/0246 711/E12.001 |
| 2012/0260023 | A1* | 10/2012 | Nagai ................... G06F 3/0679 711/E12.008 |
| 2013/0159727 | A1* | 6/2013 | Sarangdhar .......... G06F 21/445 713/189 |
| 2014/0025944 | A1 | 1/2014 | Maletsky et al. |

(Continued)

OTHER PUBLICATIONS

Jeroen Dorgelo, Mike Chaowei Chen, "Host Memory Buffer (HMB) based SSD System", Forum J-31:Pcle/NVMe Storage, Marvell, Flash Memory Summit, Aug. 13, 2015, 16 pages.

*Primary Examiner* — Shanto Abedin
(74) *Attorney, Agent, or Firm* — Foley & Lardner LLP

(57) ABSTRACT

According to one embodiment, an electronic device includes a non-volatile memory; a controller that is electrically connected to the non-volatile memory and configured for accessibility to a memory space including a plurality of management areas in a host; at least one counter that is provided for each of the plurality of management areas and configured to increment a count value each time data is stored in the corresponding one of the plurality of management areas; and a circuit configured to generate a first value relating to integrity of the data for each management area based on the count value and the data. The controller is configured to store the data and the first value associated with the data.

15 Claims, 29 Drawing Sheets

(56) References Cited

U.S. PATENT DOCUMENTS

| | | | |
|---|---|---|---|
| 2017/0269992 A1* | 9/2017 | Bandic | G06F 11/1048 |
| 2019/0245689 A1 | 8/2019 | Eckel et al. | |
| 2022/0091757 A1* | 3/2022 | Lee | G06F 3/0653 |

* cited by examiner

FIG. 2

| bits | CONTENT |
|---|---|
| 15:0 | Host Memory Descriptor Entry 0 |
| 31:16 | Host Memory Descriptor Entry 1 |
| 47:32 | Host Memory Descriptor Entry 2 |
| 63:48 | Host Memory Descriptor Entry 3 |
| ... | ... |
| 16*n+15:16*n | Host Memory Descriptor Entry n |

FIG. 3

| bits | CONTENT |
|---|---|
| 127:96 | Reserved |
| 95:64 | BUFFER SIZE: INDICATE NUMBER OF CONTINUOUS MEMORY PAGE SIZE (MPS) UNIT RELATED TO Descriptor |
| 63:00 | BUFFER ADDRESS: INDICATE HOST MEMORY ADDRESS OF Descriptor, ACCORDING TO MEMORY PAGE SIZE. LOWER BIT [n:0] OF THIS FIELD INDICATING OFFSET IN MEMORY PAGE IS 0h. IF MEMORY PAGE SIZE IS 4 KB, BIT [11:00] IS 0h, AND IF MEMORY PAGE SIZE IS 8 KB, BIT [12:00] IS 0h. |

| HOST ADDRESS | COUNTER | Valid |
|---|---|---|
| HADDR0 | 1 | 1 |
| HADDR1 | 2 | 1 |
| HADDR1+4KB | 3 | 1 |
| HADDR1+8KB | 4 | 1 |
| HADDR2 | 5 | 1 |
| HADDR2+4KB | 6 | 1 |

FIG. 26

| HOST ADDRESS | COUNTER | Valid | DATA PROTECTION MAC VALUE ADDRESS | MAC PROTECTION MAC VALUE ADDRESS |
|---|---|---|---|---|
| HADDR0 | 010 | 1 | HADDR15 | HADDR15+z |
| HADDR1 | 010 | 1 | HADDR15+y | HADDR15+z |
| HADDR2 | 111 | 1 | HADDR16 | HADDR16+z |
| HADDR2+4KB | 111 | 1 | HADDR16+y | HADDR16+z |
| HADDR15+z | 100 | 1 | N/A | N/A |
| HADDR16+z | 001 | 1 | N/A | N/A |

ELECTRONIC DEVICE

CROSS-REFERENCE TO RELATED APPLICATION

This application is based upon and claims the benefit of priority from Japanese Patent Application No. 2020-196444, filed Nov. 27, 2020, the entire contents of which are incorporated herein by reference.

FIELD

Embodiments described herein relate generally to electronic devices.

BACKGROUND

Recently, an electronic device including an internal storage has become widespread. The electronic device includes a graphic card or a memory system such as a solid state drive (SSD).

DESCRIPTION OF THE DRAWINGS

FIG. 2 illustrates a configuration example of a host memory descriptor list used by the electronic device according to the first embodiment.

FIG. 3 illustrates an example of a host memory descriptor entry included in the host memory descriptor list.

FIG. 26 illustrates a configuration example of a host memory address conversion table used in the electronic device according to the second embodiment.

DETAILED DESCRIPTION

Figure 1:
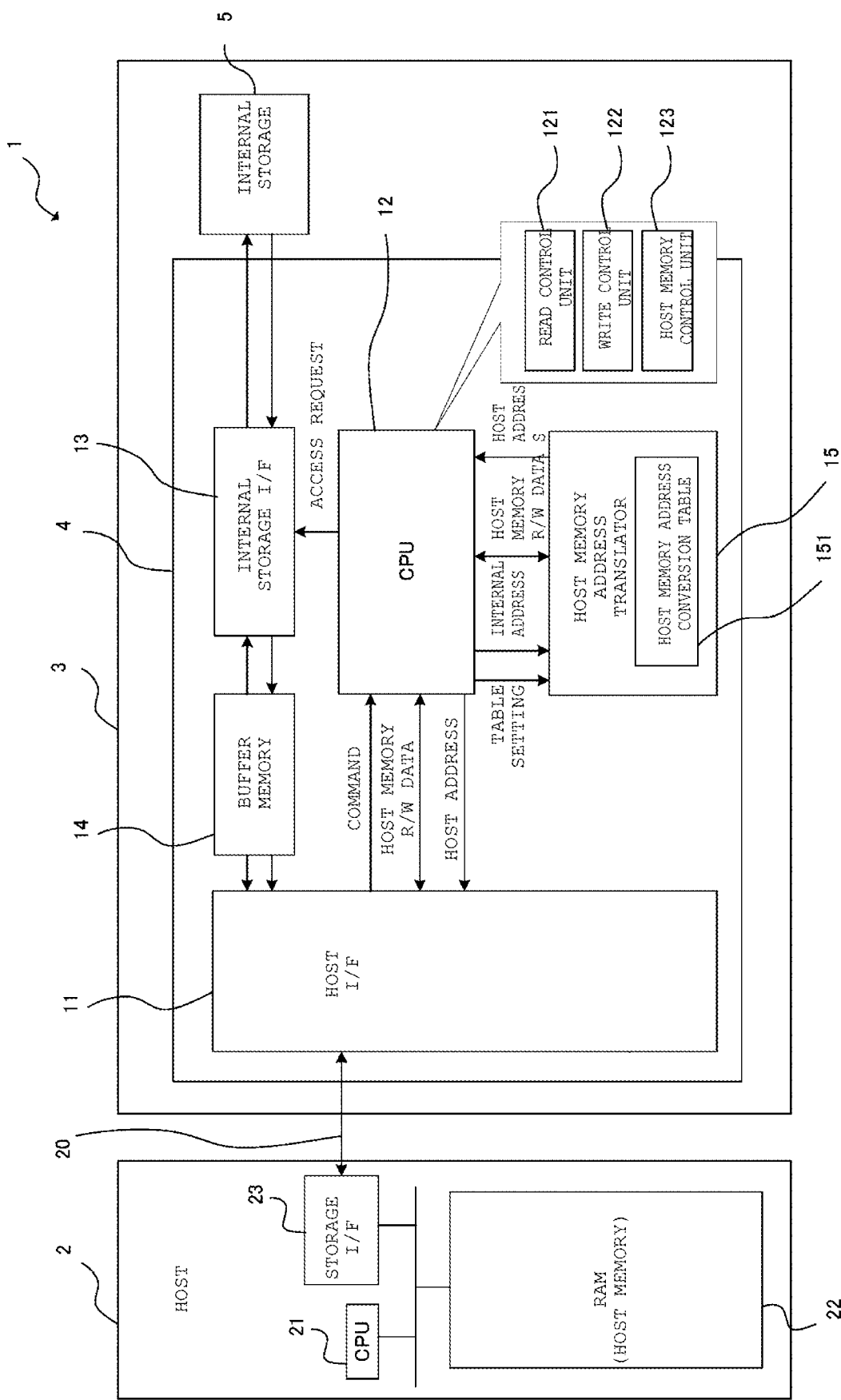
FIG. 1 illustrates a block diagram of an information processing system including an electronic device according to a first embodiment.

Embodiments provide improved security for an electronic device that stores data in a host memory.

In general, according to one embodiment, an electronic device includes a non-volatile memory; a controller that is electrically connected to the non-volatile memory and configured for accessibility to a memory space including a plurality of management areas in a host; at least one counter that is provided for each of the plurality of management areas and configured to increment a count value each time data is stored in the corresponding one of the plurality of management areas; and a circuit configured to generate a first value relating to integrity of the data for each management area based on the count value and the data. The controller is configured to store the data and the first value associated with the data.

Hereinafter, embodiments for implementing the disclosure will be described.

First Embodiment

A basic configuration of an information processing system 1 including an electronic device 3 according to a first embodiment will be described with reference to FIG. 1.

The electronic device 3 includes a controller 4 and an internal storage 5. The internal storage 5 is a non-volatile memory, for example, a NAND flash memory. The electronic device 3 may be a semiconductor storage device configured to write data to or read data from the non-volatile memory. A case where the electronic device 3 is implemented as a solid state drive (SSD) will be exemplified below, but the electronic device 3 may be implemented as, for example, a memory system, a graphic card, or an electrical control unit (ECU) for an automobile.

The information processing system 1 includes a host device 2 (hereinafter, also referred to as a host) and the electronic device 3. The host 2 may be a storage server that stores a large amount of various types of data in the electronic device 3, or may be a personal computer. A plurality of the electronic devices 3 can be connected to the host 2.

The host 2 includes a CPU 21, a random access memory (RAM) 22, a device interface (device I/F) 23, and the like. The CPU 21, the RAM 22, and the device I/F 23 may be connected to each other through a bus 20.

The CPU 21 is a processor configured to control each unit in the host 2. The CPU 21 performs various processes by executing a basic input/output system (BIOS), an operating system (OS), and the like stored in a ROM (not illustrated).

The RAM 22 is a temporary storage area (also referred to as a work area) for temporarily storing various types of data used by the CPU 21. The RAM 22 may be a dynamic RAM (DRAM) or a static RAM (SRAM). Hereinafter, the RAM 22 in the host 2 is also referred to as a host memory 22.

The host 2 is connected to the electronic device 3 through the device I/F 23. An interface standard of the device I/F 23 conforms to, for example, PCI Express (PCIe) (registered trademark) and NVM Express (NVMe) (registered trademark).

The electronic device 3 may be used as a storage of an information processing device that functions as the host 2. The electronic device 3 may be built in the information processing device or may be connected to the information processing device through a cable or a network.

The internal storage 5 includes a plurality of blocks. Each block includes a plurality of pages. One block functions as the smallest unit of data erasing operation. The blocks are sometimes referred to as "erasing blocks" or "physical blocks". Each page includes a plurality of memory cells connected to the same word line. One page is a unit of a data write operation and a data read operation. The word line may be used as the unit of the data write operation and the data read operation.

The number of programs/erase cycles (the number of P/E cycles) for each block has an upper limit. The upper limit of the number of P/E cycles is also called the maximum number of P/E cycles. One P/E cycle of a certain block includes a data erasing operation for erasing all memory cells in the block and a data write operation for writing data to each page of the block.

The controller 4 functions as a memory controller configured to control the internal storage 5. The controller 4 is implemented by a circuit such as a system-on-a-chip (SoC).

The controller 4 includes a host interface (host I/F) 11, a CPU 12, an internal storage interface (internal storage I/F) 13, a buffer memory 14, a host memory address translator 15, and the like. The host I/F 11, the CPU 12, the internal storage I/F 13, the buffer memory 14, and the host memory address translator 15 may be connected to each other through a bus.

The host I/F 11 functions as a circuit for controlling communication with the host 2 or receiving a command. The host I/F 11 receives various commands from the host 2, for example, various control commands and I/O commands. The control commands include a command (for example, a Set Features command) for requesting enablement/disablement of use of part of an area in the host memory 22. The I/O commands include a write command and a read command.

The internal storage i/F 13 corresponds to an interface standard such as Toggle DDR and Open NAND Flash interface (ONFI). The internal storage I/F 13 electrically connects the controller 4 to the internal storage 5.

The buffer memory 14 includes a buffer area for temporarily storing data written to the internal storage 5 or data read from the internal storage 5. The buffer memory 14 is, for example, an SRAM or a DRAM. The buffer memory 14 may be provided to the outside of the controller 4. In this case, the controller 4 accesses the buffer memory 14 through an interface provided in the controller 4.

The CPU 12 is a processor configured to control each unit of the controller 4. The CPU 12 performs various processes by executing firmware (FW) stored in the internal storage 5 or a ROM (not illustrated). The CPU 12 can perform a command process for processing various commands from the host 2 in addition to a flash translation layer process (FTL process) to be described below. The above-described FW executed by the CPU 12 controls an operation of the CPU 12. The dedicated hardware in the controller 4 may perform a part or all of the FTL process and the command process.

The controller 4 can exclusively use part of an area in the host memory 22. An area in the host memory 22 which is allocated to the controller 4 may be one area in the host memory 22. The allocated area may be a plurality of dispersed areas in the host memory 22. The controller 4 can use a part of the area in the host memory 22 as a temporary storage area provided with a buffer area, a cache area, a storage area of various types of data, and the like from time when use of a part of the area in the host memory 22 is enabled to time when the use of a part of the area in the host memory 22 is disabled. The use of part of the area in the host memory 22 is disabled, for example, at a point in time when the electronic device 3 is powered on and is enabled according to a request from the host 2. Hereinafter, a part of the area in the host memory 22 used by the controller 4 is also referred to as an area in the host memory 22.

The controller 4 can receive host memory area information from the host 2 together with a command that requests enablement of use of the area in the host memory 22. The host memory area information includes a list representing one or more areas in the host memory 22. The controller 4 may use one or more areas in the host memory 22 from time when the use of the area in the host memory 22 is enabled to time when the use of the area in the host memory 22 is disabled according to a command. A method for the controller 4 to use one or more areas in the host memory 22 based on the host memory area information will be described with reference to FIGS. 2 to 4 to be described below.

The controller 4 may function as a flash translation layer (FTL) configured to perform data management and block management of the internal storage 5. The data management performed by the FTL includes (1) management of mapping information representing a corresponding relationship between each logical address and each physical address of the internal storage 5, and (2) a process for concealing read/write of a page unit and an erasing (erase) operation of a block unit, and the like. The logical address is used by the host 2 to perform address designation of the electronic device 3. Hereinafter, a logical block address (LBA) is used as the logical address, in some embodiments.

The controller 4 manages mapping between each LBA and each physical address based on a logical-to-physical address conversion table. The controller 4 manages the mapping between each LBA and each physical address in a specific management size unit by using the logical-to-physical address conversion table. A physical address corresponding to a certain LBA represents a physical storage position in the internal storage 5 to which data of the LBA is written. The controller 4 may load the logical-to-physical address conversion table from the internal storage 5 into a RAM (not illustrated) in the electronic device 3 when the electronic device 3 is powered on.

Data write to one page can be made only once per a P/E cycle. When updating data corresponding to a certain LBA, the controller 4 does not write update data to a first physical storage position where the data corresponding to the LEA is currently stored and writes the update data to a second physical storage position different from the first physical storage position. Then, the controller 4 disables data which is stored in the first physical storage position before being updated by updating the logical-to-physical address conversion table such that the LBA corresponds to the second physical storage position.

In order to realize functions such as the FTL function described above, the controller 4 is configured to read and write the logical-to-physical address conversion table, system data including internal information of the controller 4, and a large amount of data such as fragmented user data to the internal storage 5. The user data is data that write to the electronic device 3 from the host 2 is instructed. The user data is data designated by a write request (for example, write command) from the host 2. The electronic device 3 receives the user data associated with a write request from the host 2 in response to receiving the write request from the host 2.

A method of efficiently treating a large amount of data described above is implemented by a method of reading data from the internal storage 5 to a higher-speed memory (an SRAM, a DRAM, and the like). However, mounting a high-speed memory with high capacitances is a cause of increasing a cost of the electronic device 3.

The host memory 22 described above may be used as a method of reducing an increase in capacitances of a memory. The controller 4 can use a part of the host memory 22 as a temporary storage area (or management area). Various types of data that can be stored in a memory (for example, the buffer memory 14) in the electronic device 3 can also be stored in the host memory 22. The data stored in the host memory 22 is management data and the like for the controller 4 to manage the electronic device 3. By using the host memory 22, a process such as FTL can be speeded up without increasing capacitances of the memory in the electronic device 3.

The host 2 transmits a request to enable use of the area in the host memory 22 to the electronic device 3, for example, according to that a user using the host 2 is switched, according to that the host 2 is powered on, or according to that the electronic device 3 is shifted from a power saving mode to a normal mode. In order to designate an area in the host memory 22 used for the controller 4, the host 2 transmits, for example, host memory area information including a list representing one or more areas in the host memory 22 to the electronic device 3, together with this command.

Further, the host 2 transmits a request to disable the use of the area in the host memory 22 to the electronic device 3, for example, before a user using the host 2 is switched, before the host 2 is powered off, or before the electronic device 3 is shifted from the normal mode to the power saving mode.

The host I/F 11 transmits a request representing enablement of the use of the area in the host memory 22 to the CPU 12 according to a command from the host 2 requesting enablement of the use of the area in the host memory 22. Further, the host I/F 11 transmits the host memory area information for designating an area in the host memory 22 used for the controller 4 to the CPU 12. According to the request, the CPU 12 enables the use of the area in the host memory 22. The CPU 12 causes the host memory address translator 15 to generate a host memory address conversion table 151 for the controller to use the area designated by the host memory area information.

Further, the host I/F 11 transmits a request representing disablement of the use of the area in the host memory 22 to the CPU 12 according to a command from the host 2 requesting disablement of the use of the area in the host memory 22. According to the request, the CPU 12 disables the use of the area in the host memory 22. The CPU 12 causes the host memory address translator 15 to update the host memory address conversion table 151 such that the area in the host memory 22 used by, for example, the controller 4 is not used.

Further, the host I/F 11 transmits data to be written to the host memory 22 to the host 2 and receives data read from the host memory 22 from host 2 from time when a host memory function is enabled to time when the host memory function is disabled. In other words, the host I/F 11 performs a process for writing data to the host memory 22 and a process for reading data from the host memory 22 from time when use of a part of an area in the host memory 22 is enabled to time when the use is disabled. The data to be written to the host memory 22 is data that the controller 4 is trying to write to the host memory 22 and is not actually written yet.

FIG. 2 illustrates an example of a host memory descriptor list. The host memory descriptor list represents which area in the host memory 22 is used by the controller 4 and is an example of the host memory area information. The host memory descriptor list includes one or more host memory descriptor entries corresponding to one or more areas, respectively, in the host memory 22. Each of the host memory descriptor entries includes information for specifying one area in the host memory 22 used for the controller 4.

As illustrated in FIG. 2, one or more host memory descriptor entries each have a length of, for example, 16 bytes (=128 bits) and are arranged sequentially in the host memory descriptor list.

FIG. 3 illustrates an example of the Host Memory Descriptor Entry. A field [63:0] from a 0th bit to a 63rd bit in the host memory descriptor entry indicates an address of a corresponding area. The address indicates a host address at the beginning of the area and is represented by the host address (that is, a host address of an MPS unit) specified according to a memory page size (MPS). The memory page is the smallest access unit for the host memory 22. The MPS indicates a size of the memory page and is, for example, 4 KB, 8 KB, and the like.

A field [95:64] from a 64th bit to a 95th bit in the host memory descriptor entry indicates a size of a corresponding area. The area includes one or more areas in the MPS unit. Further, one or more areas of the MPS unit configures a continuous area in the host memory 22. The size is represented by the number of one or more continuous areas in MPS unit, which is included in a corresponding area. Hereinafter, one area of the MPS unit is also referred to as an MPS area.

A field [127:96] from a 96th bit to a 127th bit is an unused reserved area.

The CPU 12 causes the host memory address translator 15 to generate (or update) the host memory address conversion table 151 by using host memory area information 25 received from the host 2 through the host I/F 11.

An example in which the host memory address conversion table 151 is generated by using the host memory area information 25 will be described with reference to FIG. 4. Hereinafter, in order to make description easy to understand, a case where the host memory area information 25 is the host memory descriptor list and the MPS is 4 KB will be exemplified.

Figure 4:
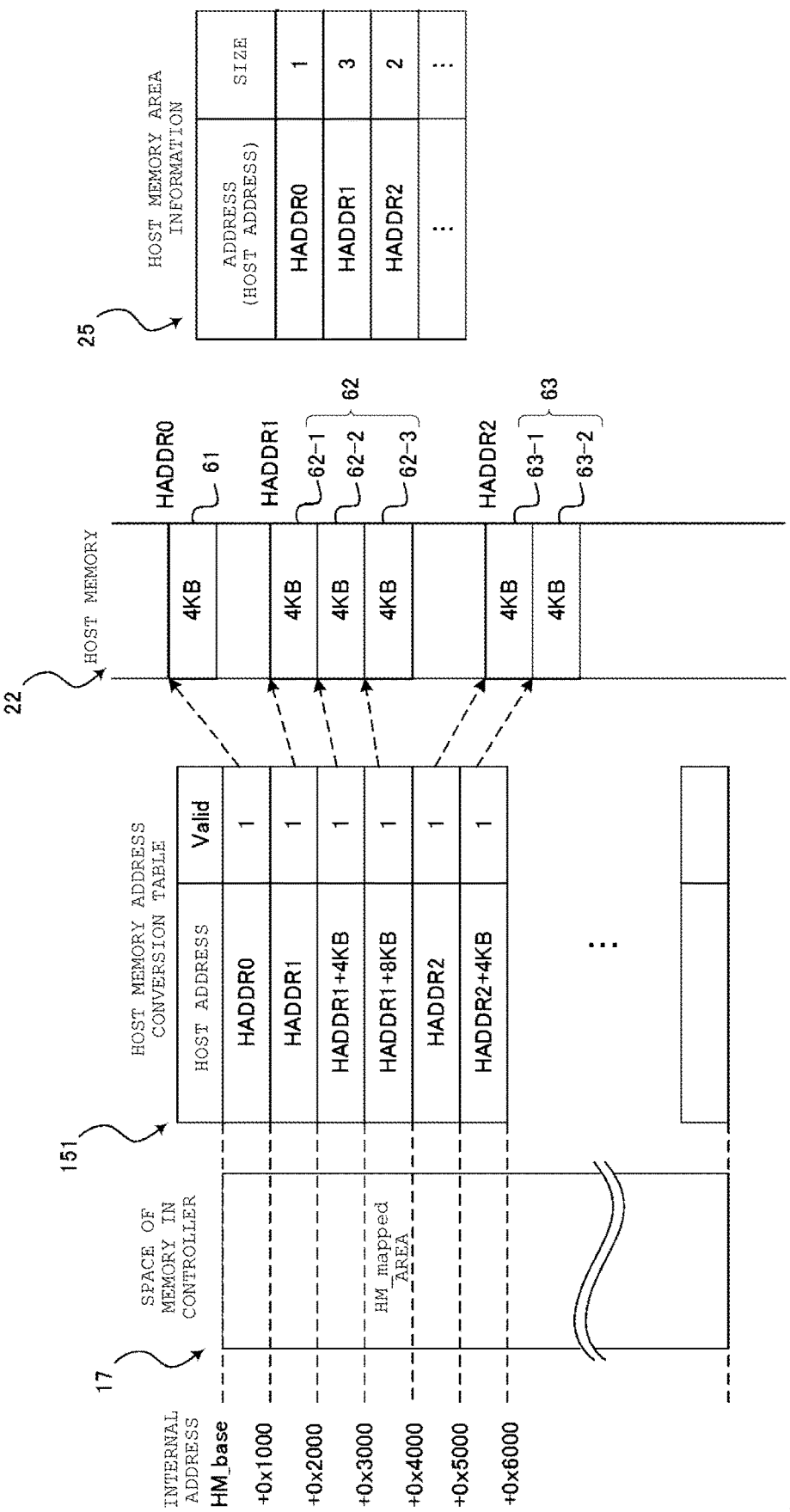
FIG. 4 illustrates a relationship between an address space of a host memory recognized by the electronic device according to the first embodiment and an area in the host memory.

In the example illustrated in FIG. 4, three areas 61, 62, and 63 in the host memory 22 are used by the controller 4. As indicated by the host memory area information 25, the three areas 61, 62, and 63 include (1) a first area 61 where an address (that is, a host address indicating the beginning of the area) is HADDR0 and a size is 1, (2) a second area 62 where an address is HADDR1 and a size is 3, and (3) a third area 63 where an address is HADDR2 and a size is 2. Further, the three areas 61, 62, and 63 are not continuous areas in the host memory 22 but are dispersed areas.

The first area 61 includes one MPS area because having a size of 1. The second area 62 includes three MPS areas 62-1, 62-2, and 62-3 because having a size of 3. The third area 63 includes two MPS areas 63-1 and 63-2 because having a size of 2. That is, the area in the host memory 22 configured with the first area 61, the second area 62, and the third area 63 includes a total of six MPS areas. Thus, it can be said that the host memory area information 25 indicates the six MPS areas included in the three areas 61, 62, and 63 according to addresses and sizes corresponding to the three areas 61, 62, and 63, respectively.

An address space available to the CPU 12 includes a host memory_mapped (HM_mapped) area 17. The CPU 12 can access the host memory 22 by accessing the HM_mapped area 17. The CPU 12 and the host memory address translator 15 access the three dispersed areas 61, 62, and 63, that is, the six MPS areas included in the three areas 61, 62, and 63 as continuous HM_mapped area 17. This is because, when each unit (for example, the CPU 12) in the controller 4 directly accesses the dispersed areas 61, 62, and 63, an operation of each unit is complicated.

The CPU 12 and the host memory address translator 15 generate the host memory address conversion table 151 based on the HM_mapped area 17. The host memory address conversion table 151 includes address conversion information indicating a correspondence between an internal address indicating a position in the HM_mapped area 17 and a host address indicating a position in the actual host memory 22 including the areas 61, 62, and 63. The internal address is represented by an HM_base and an offset address from the HM_base. The HM_base indicates the beginning of the HM_mapped area 17.

When the CPU 12 designates a position in the HM_mapped area 17 to be accessed by using the internal address, the host memory address translator 15 determines a host address corresponding to the designated internal address by using the host memory address conversion table 151. That is, the host memory address translator 15 has an address conversion mechanism that treats the three dispersed areas 61, 62, and 63 as the HM_mapped area 17 which is a continuous memory space. Thereby, the CPU 12 can access the host memory 22 through the host memory address translator 15.

More specifically, the CPU 12 and the host memory address translator 15 map the internal address HM_base indicating the beginning of the HM_mapped area 17 to a host address indicating the beginning of any one of the areas 61, 62, and 63 (area 61 in FIG. 4). Then, the CPU 12 and the host memory address translator 15 continuously map the three areas 61, 62, and 63 in a memory space of the HM_mapped area 17 having the internal address HM_base as the beginning based on a host address (buffer address) and a buffer size of each of the areas 61, 62, and 63 indicated by the host memory area information 25. The host memory address conversion table 151 indicates a correspondence between the internal address and the host address due to the mapping.

In the example illustrated in FIG. 4, an internal address of a management unit (here, 4 KB unit which is the MPS) included in a memory space of the HM_mapped area 17 is indicated by using the internal address HM_base as the beginning. That is, HM_base, HM_base+0×1000, HM_base+0x2000, . . . , and HM_base+0×6000 are illustrated. The CPU 12 divides the respective areas 61, 62, and 63 indicated by the host memory area information 25 into management units. Then, the CPU 12 maps the internal address to the host address indicating the beginning of each of the plurality of areas of a management unit obtained by division. Each of the plurality of areas of the management units is an area that can be accessed by the controller 4.

The host memory address conversion table 151 illustrated in FIG. 4 includes six entries indicating following mapping.
(1) Mapping of the internal address "HM_base" and the host address "HADDR0" indicating the beginning of the first area 61
(2) Mapping of the internal address "HM_base+0×1000" and the host address "HADDR1" indicating the beginning of the second area 62
(3) Mapping of the internal address "HM_base+0x2000" and the host address "HADDR1+4 KB" indicating the beginning of the second MPS area 62-2 in the second area 62
(4) Mapping of the internal address "HM_base+0x3000" and the host address "HADDR1+8 KB" indicating the beginning of the third MPS area 62-3 in the second area 62
(5) Mapping of the internal address "HM_base+0×4000" and the host address "HADDR2" indicating the beginning of the third area 63
(6) Mapping of the internal address "HM_base+0×5000" and the host address "HADDR2+4 KB" indicating the beginning of the second MPS area 63-2 in the third area 63

Here, the host memory address conversion table 151 does not include the internal address itself. A correspondence between the internal address starting from HM_base and the host address is represented by a position (order) of each entry including the host address in the host memory address conversion table 151. As described above, the host address HADDR0 included in a first entry in the host memory address conversion table 151 corresponds to the internal address HM_base indicating the beginning of the HM_mapped area 17. Thus, the host memory address translator 15 can specify an entry in the host memory address conversion table 151 corresponding to the internal address based on a relative position of a certain internal address for HM_base. That is, an MPS area (more specifically, MPS area including a host address corresponding to the internal address) corresponding to the internal address can be specified. The host memory address conversion table 151 may include an internal address.

A valid field in the host memory address conversion table 151 indicates whether or not the area is valid. For example, "1" is set to the valid field when the CPU 12 can use the area, and "0" is set to the valid field when the CPU 12 cannot use the area. The host memory address conversion table 151 illustrated in FIG. 4 illustrates that the six MPS areas included in the three areas 61, 62, and 63 are valid, and that the CPU 12 can use the MPS areas.

By using the host memory address conversion table 151, when the CPU 12 designates a position in the HM_mapped area 17 to be accessed with an internal address, the host memory address translator 15 can determine a host address corresponding to the designated internal address. Thus, the CPU 12 can access the inside of the host memory 22 through the host memory address translator 15.

After the host memory address conversion table 151 is generated, the CPU 12 may further receive additional host memory area information 25 from the host 2 through the host I/F 11. The additional host memory area information 25 indicates an additionally allocated area in the host memory 22 while the area in the host memory 22 is used by the controller 4. In this case, the CPU 12 and the host memory address translator 15 also maps the area indicated by the additional host memory area information 25 so as to be treated as a part of the HM_mapped area 17 which is a continuous virtual memory space. Then, the CPU 12 and the host memory address translator 15 updates the host memory address conversion table 151 based on the mapping.

Returns to FIG. 1. The CPU 12 functions as a read control unit 121, a write control unit 122, and a host memory control unit 123.

The read control unit 121 reads user data in accordance with a read command from the internal storage 5. The read control unit 121 temporarily stores the read user data in the buffer memory 14. The read control unit 121 may control each unit of the controller 4 such that the read user data is temporarily stored in the host memory 22. That is, the read control unit 121 uses a part of areas of the buffer memory 14 and the host memory 22 as a read buffer for accumulating the read user data.

The write control unit 122 writes user data received from the host 2 to the internal storage 5 in response to receiving a write command. The write control unit 122 temporarily stores user data to be written to the internal storage 5 in the buffer memory 14. The write control unit 122 may control each unit of the controller 4 such that the user data to be written to the internal storage 5 is temporarily stored in the host memory 22. That is, the write control unit 122 uses a part of areas of the buffer memory 14 and the host memory 22 as a write buffer for accumulating the user data to be written.

The host memory control unit 123 controls enablement/disablement of use of the area in the host memory 22. As described above, the host I/F 11 transmits, to the CPU 12, a request indicating enablement of the use of the area in the host memory 22 and the host memory area information 25 for designating the area of the host memory 22 to be used. The host memory area information 25 includes a list indicating one or more areas in the host memory 22.

The host memory control unit 123 controls access to the host memory 22. More specifically, the host memory control unit 123 enables the use of the area in the host memory 22 according to the request indicating the enablement of the area in the host memory 22. Then, the host memory control unit 123 causes the host memory address translator 15 to manages one or more areas by using the host memory area information 25 including the list indicating the one or more areas in the host memory 22 from time when the use of the area in the host memory 22 is enabled to time when the use of the area in the host memory 22 is disabled. More specifically, the host memory control unit 123 causes the host memory address translator 15 to generate the host memory address conversion table 151 for managing the host memory 22.

Further, as described above, the host I/F 11 transmits a request indicating disablement of the use of the area in the host memory 22 to the CPU 12. The host memory control unit 123 disables the use of the area in the host memory 22 according to the request indicating the disablement of the use of the area in the host memory 22.

Further, the CPU 12 can write data to the host memory 22 and read data from the host memory 22 through the host I/F 11.

More specifically, when writing data (hereinafter, also referred to as host memory write data) to the host memory 22, the host memory control unit 123 of the CPU 12 transmits an internal address to which the host memory write data is to be written to the host memory address translator 15.

The host memory address translator 15 converts the internal address transmitted from the host memory control unit 123 into a host address using the host memory address conversion table 151. For example, the host memory address translator 15 specifies an entry corresponding to the internal address in the host memory address conversion table 151 to convert the internal address into a host address by acquiring a host address included in the entry.

The converted host address is transmitted to the CPU 12, and the host address is transmitted from the CPU 12 to the host 2 through the host I/F 11. In the host 2, the host memory write data is written to the area in the host memory 22 specified by the host address.

As described above, the CPU 12 can write host memory write data to a designated internal address.

Further, when there is data to be read from the host memory 22, the host memory control unit 123 transmits an internal address from which data is to be read to the host memory address translator 15. Then, the host memory address translator 15 converts the internal address transmitted from the host memory control unit 123 into a host address by using the host memory address conversion table 151.

The host address is transmitted to the CPU 12 and is transmitted to the host 2 through the host I/F 11. Thereby, data (hereinafter, also referred to as host memory read data) is read from an area in the host memory 22 specified by the host address and transmitted to the electronic device 3.

As described above, the CPU 12 can read host memory read data from the designated internal address.

Figure 5:
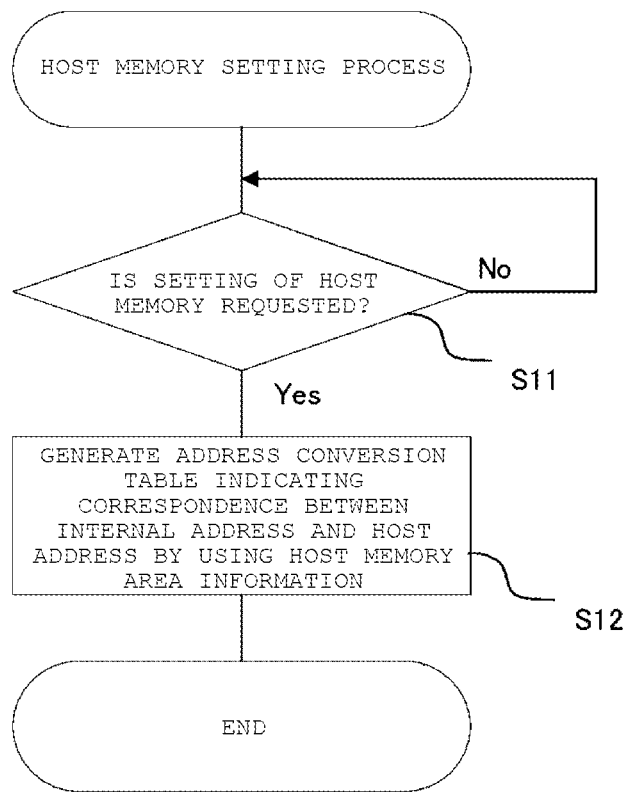
FIG. 5 is a flowchart of an example of a procedure of a host memory setting process performed by the electronic device according to the first embodiment.

A flowchart of FIG. 5 illustrates an example of a procedure of a setting process of using an area in the host memory 22 performed by the controller 4.

First, the controller 4 determines whether or not setting of use of the area in the host memory 22 is requested (step S11). The controller 4 determines that the setting of use of the area in the host memory 22 is requested, for example, when the host memory is enabled or when a host memory descriptor list is received from the host 2. When the setting of use of the area in the host memory 22 is not requested (step S11_NO), the process returns to step S11, and whether or not the setting of use of the area in the host memory 22 is requested is determined again.

When the setting of use of the area in the host memory 22 is requested (step S11_Yes), the controller 4 generates the host memory address conversion table 151 indicating a correspondence between an internal address and a host address by using the host memory area information 25 (for example, the host memory descriptor list) (step S12). The internal address is recognized by the controller 4 (more specifically, the CPU 12) and specifies a position in the HM_mapped area 17. The host address is recognized by the host 2 and specifies a position in the host memory 22. The controller 4 converts an internal address into a host address by using the host memory address conversion table 151.

As described above, the host memory address conversion table 151 for converting an internal address into a host address is generated.

Figure 6:
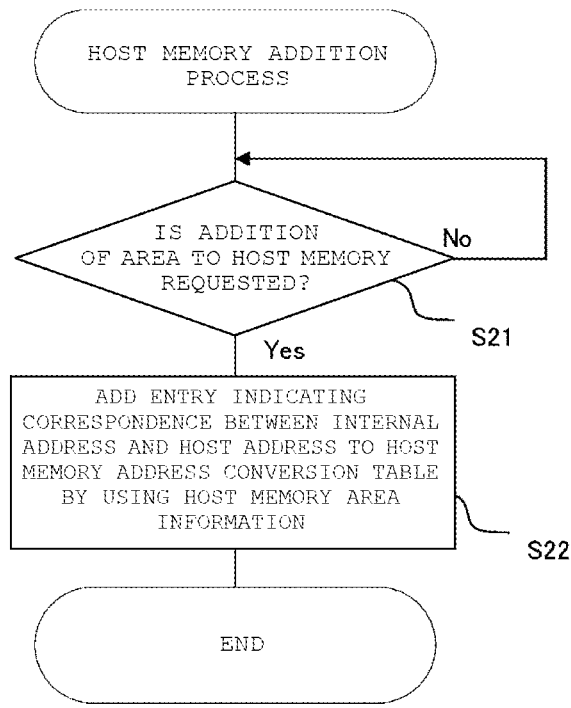
FIG. 6 is a flowchart of an example of a procedure of a host memory addition process performed by the electronic device according to the first embodiment.

A flowchart of FIG. 6 illustrates an example of a procedure of the host memory 22 addition process performed by the controller 4. The host memory 22 addition process is for the controller 4 to use also an additionally allocated area in the host memory 22 while the host memory 22 is used by the controller 4.

First, the controller 4 determines whether or not adding an area to the host memory 22 is requested (step S21). When the controller 4 receives the additional host memory area information 25 (for example, an additional host memory descriptor list) from the host 2, it is determined that the addition of an area to the host memory 22 used by the controller 4 is requested. When the addition of an area to the host memory 22 used by the controller 4 is not requested (step S21_No), the process returns to step S21 .

When the addition of an area to the host memory 22 used by the controller 4 is requested (step S21_Yes), the controller 4 adds an entry including address conversion information indicating a correspondence between an internal address and a host address to the host memory address conversion table 151 by using the additional host memory area information 25 (step S22). The controller 4 maps also an area indicated by the additional host memory area information 25 so as to be treated as a part of the HM_mapped area 17 which is a continuous virtual memory space. Thereby, the HM_mapped area 17 recognized by the controller 4 is also expanded so as to correspond to the addition of an area to the host memory 22.

As described above, an entry including address conversion information corresponding to an area added to the host memory 22 used by the controller 4 can be added to the host memory address conversion table 151.

Figure 7:
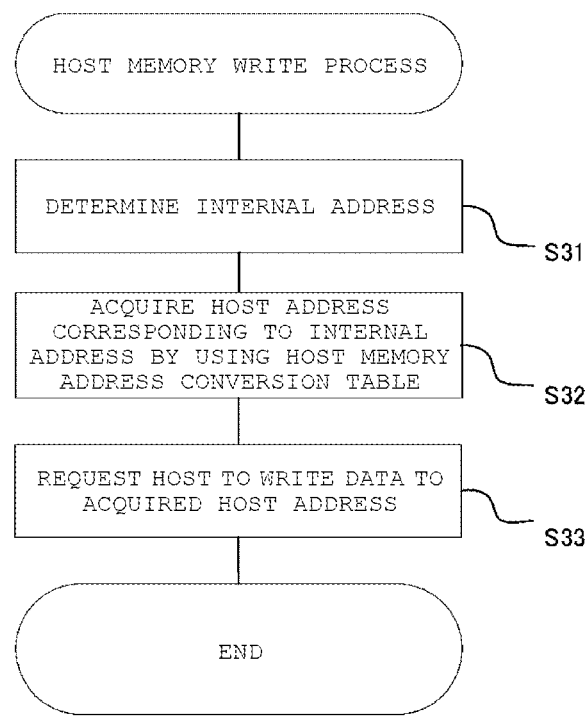
FIG. 7 is a flowchart of an example of a procedure of a host memory write process performed by the electronic device according to the first embodiment.

A flowchart of FIG. 7 illustrates an example of a procedure of a host memory write process performed by the controller 4.

The controller 4 determines an internal address in the HM_mapped area 17 to which data is to be written (step S31). Then, the controller 4 acquires a host address corresponding to the internal address by using the host memory address conversion table 151 (step S32).

Next, the controller 4 requests the host 2 to write data to the acquired host address (step S33).

As described above, the controller 4 can write data in the host memory 22.

Figure 8:
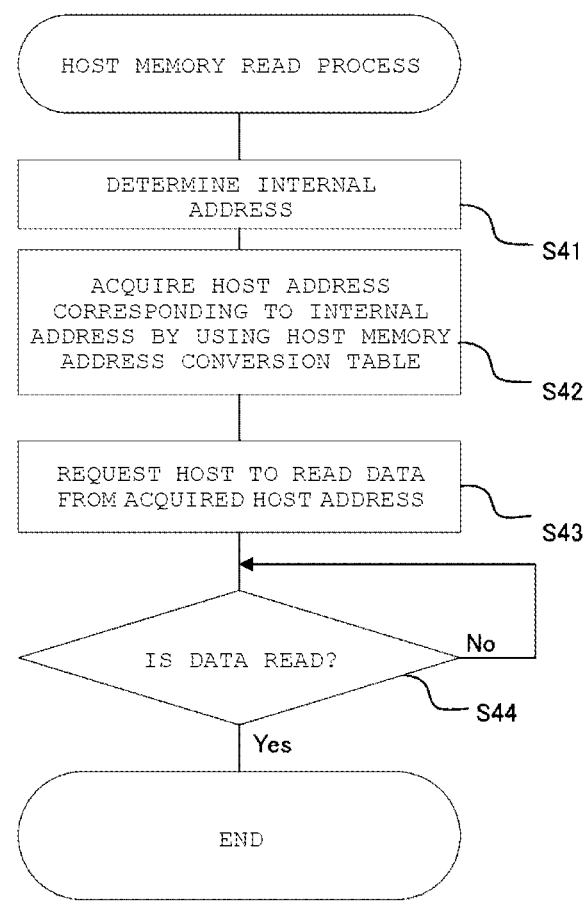
FIG. 8 is a flowchart of an example of a procedure of a host memory read process performed by the electronic device according to the first embodiment.

A flowchart of FIG. 8 illustrates an example of a procedure of a host memory read process performed by the controller 4.

The controller 4 determines an internal address in the HM_mapped area 17 from which data is to be read (step S41). The controller 4 acquires a host address corresponding to the internal address by using the host memory address conversion table 151 (step S42). Then, the controller 4 requests the host 2 to read data stored in the host address (step S43).

Next, the controller 4 determines whether or not the data read from the host memory 22 according to the request is received from the host 2 (step S44). When data is not received (step S44_No), the process returns to step S44. Meanwhile, when the data is received (step S44_Yes), the controller 4 ends the host memory read process.

Figure 9:
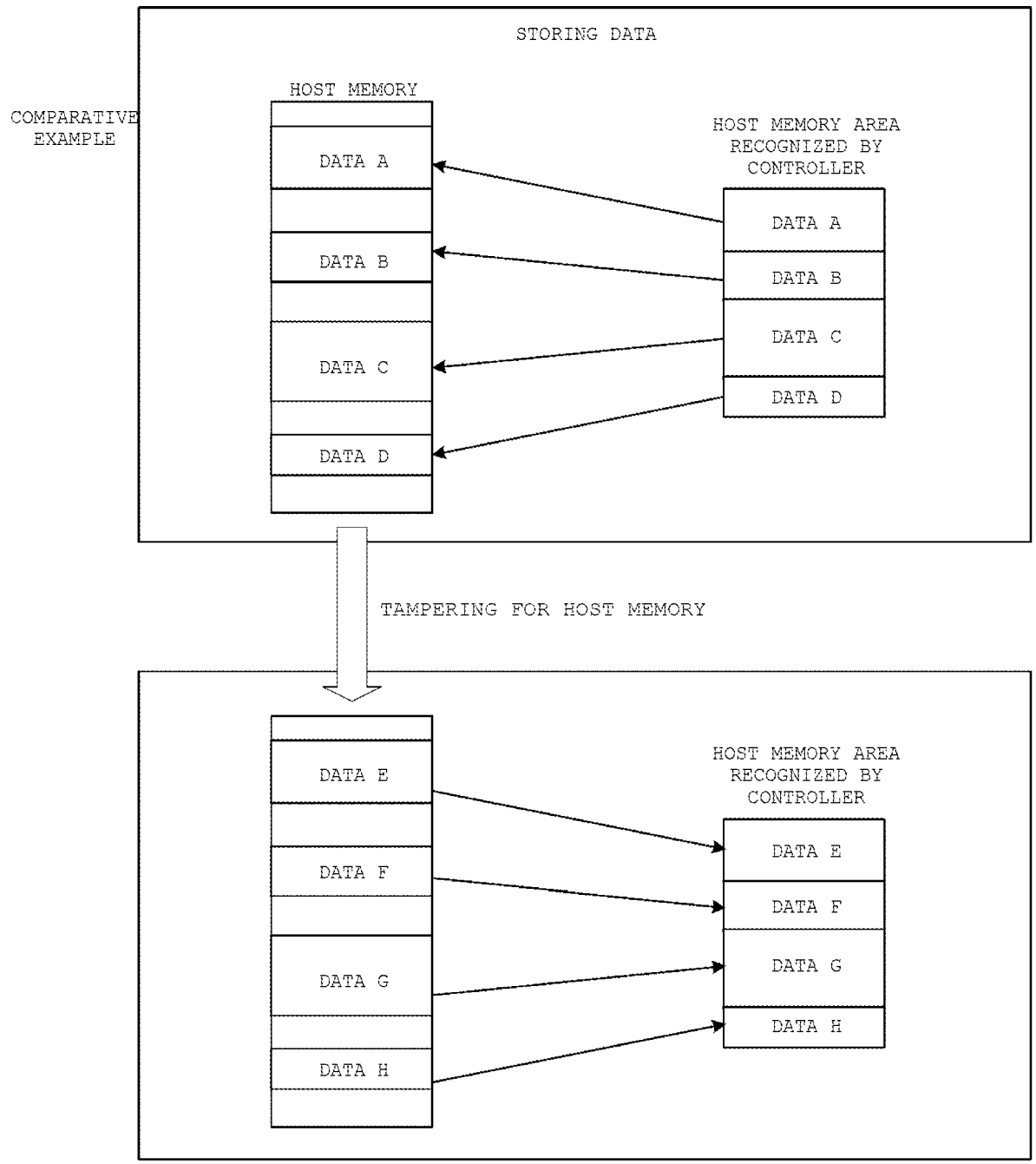
FIG. 9 is a diagram of an example in which data stored in the host memory is tampered with by an electronic device according to a comparative example.

FIG. 9 illustrates an example in which data stored in a host memory of an information processing system including an electronic device according to a comparative example is tampered with. When data is stored in a host memory used by a controller, the data can be tampered with. Here, an example is provided in which, when data A, B, C, and D are stored in an HM_mapped area recognized by a controller of an electronic device, the data A, B, C, and D are stored as they are in the host memory. That is, each of the data A, B, C, and D is stored in the host memory without being protected.

These data A, B, C, and D can be tampered with by accessing the host memory. For example, data A, B, C, and D can be tampered to data E, F, G, and H, respectively. Due to the tampering, when the controller tries to read data from the HM_mapped area, the tampered data E, F, G, and H is read from the host memory instead of the data A, B, C, and D. The tampered data can cause a malfunction of the electronic device.

Accordingly, the electronic device 3 of the present embodiment manages data by using a message authentication code (MAC), which is a method different from an error detection code such as cyclic redundancy check (CRC) or an error correction code such as an error correction code (ECC). The MAC is commonly used as a device of checking data integrity. The MAC is calculated from data of a target of which integrity is to be guaranteed. The MAC includes a hash-based message authentication code (HMAC) and a cipher-based message authentication code (CMAC). The HMAC is generated by inputting a key and data of a target of which integrity is to be guaranteed to a hash algorithm. The CMAC is generated by inputting a key and data of a target of which integrity is to be guaranteed to a cryptographic algorithm. A person who shares a key as secret information can check data integrity by calculating a MAC value from data of a target of which integrity is to be guaranteed. That is, the MAC value is a code (value) that is generated such that a recipient can detect a change in content of received certain data and enables protection and authentication of data integrity. The electronic device 3 does not share a key used for calculating the MAC with another person, particularly a host. Hereinafter, in the present embodiment, a case where data is managed by the MAC will be described.

Figure 10:
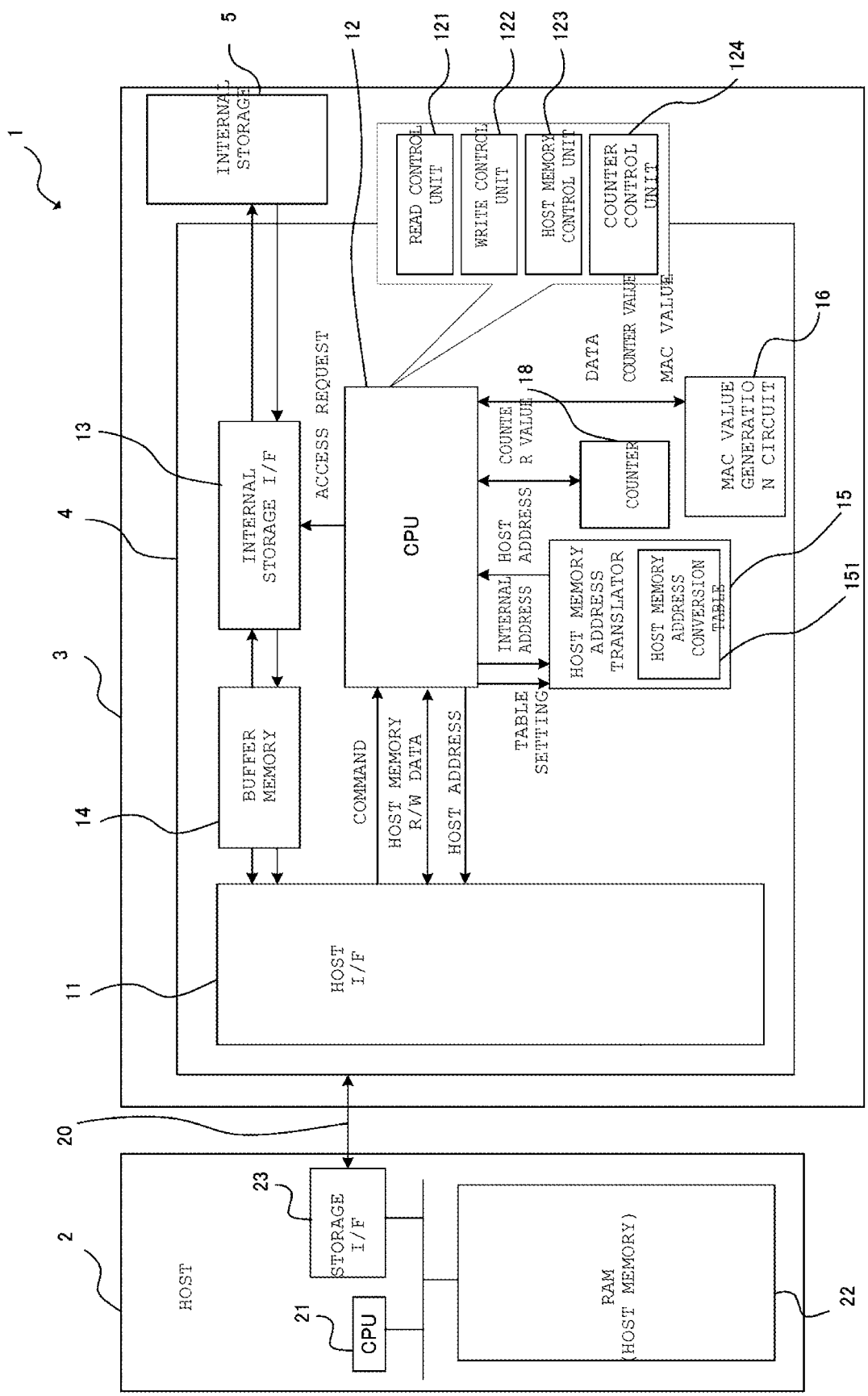
FIG. 10 illustrates a block diagram of an information processing system including the electronic device according to the first embodiment.

As illustrated in FIG. 10, the electronic device 3 further includes a counter 18, a counter control unit 124, and a MAC value generation circuit 16. The counter control unit 124 includes a random number generation circuit (not illustrated). The counter control unit 124 sets a random number to an initial value of the counter 18 when power is supplied to a memory system and when the host 2 initializes the host memory 22. The time when power is supplied includes also time of recovery from a power saving state. The counter control unit 124 sets a value of the counter 18 to the MAC value generation circuit 16. The value of the counter 18 is randomized by a pseudo-random number generation circuit (not illustrated) in the MAC value generation circuit 16. The randomized value of the counter 18 is used as a key. The MAC value generation circuit 16 performs conversion according to calculation using data stored in the MPS area and a key. The value converted by the MAC value generation circuit 16 is used as a MAC value. The MAC value generation circuit 16 generates a MAC value for each MPS area in the host memory 22 and stores a corresponding MPS area and the MAC value in the host memory 22 in association with each other. In the present embodiment, each area of a management unit of data in the host memory 22 is assumed to be an MPS area and is represented as a page hereinafter. The area of management unit is not limited to one page, and a plurality of pages may be treated as one management unit.

Figure 11:
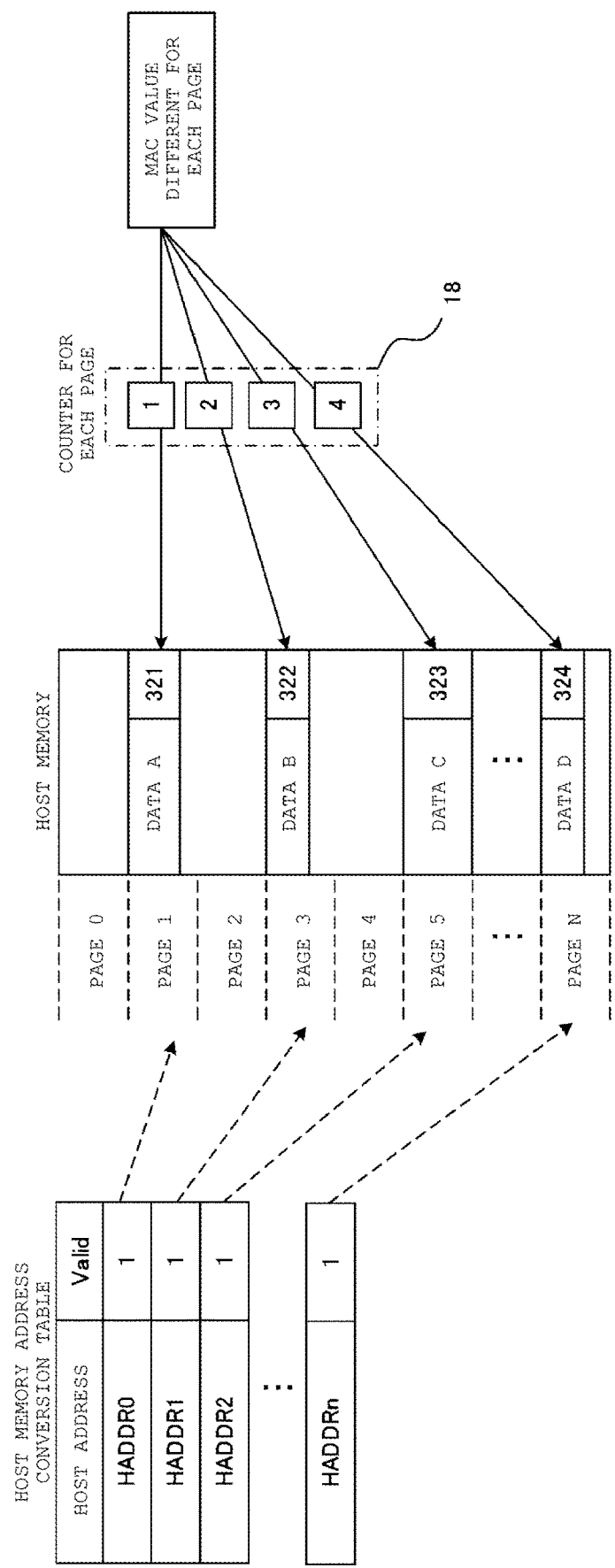
FIG. 11 illustrates a relationship between an MPS area and a MAC value according to the first embodiment.

As illustrated in FIG. 11, in the electronic device 3 according to the present embodiment, the data A, B, C, and D stored in each MPS area in the host memory 22 are assigned by MAC values respectively corresponding thereto. Here, the MPS area is assumed to be, for example, 4 KB. In the figure, a host address is designated to the MPS area of a host memory corresponding to each page. For example, a host address of an MPS area corresponding to a page 1 is HADDR0. Further, a page 3 is designated by a host address called HADDR1, a page 5 is designated by a host address called HADDR2, and a page N is designated by a host address called HADDRn. A size of each of the stored data A, B, C, and D is, for example, 3 KB for the data A, 2 KB for the data B, 4 KB for the data C, and 3 KB for the data D. In this way, data written to one page is not limited to 4 KB. A plurality of counters 18-1, 18-2, 18-3, and 18-4 are associated with the plurality of MPS areas, respectively. The controller 4 derives a plurality of MAC values from a plurality of counters corresponding to the plurality of MPS areas respectively and from data saved in the plurality of MPS areas, and checks integrity of data to be written to each of the plurality of MPS areas. For example, when the page 1, the page 3, the page 5, and the page N, which are MPS areas in the host memory 22, are used as the host memory 22 used by the electronic device 3, MAC values 321, 322, 323, and 324 are used correspondingly for each of the page 1, the page 3, the page 5, and the page N.

Here, detection of destruction and tampering of data due to a MAC will be described.

As illustrated in FIG. 10, the controller 4 includes the plurality of counters 18-1, 18-2, 18-3, and 18-4. The counter 18 has, for example, 128 bits. A plurality of counters 18 are provided, and correspond to the plurality of MPS areas of the host memory 22, respectively. In other words, one of the plurality of counters 18 corresponds to one of the plurality of MPS areas of the host memory 22 (see FIG. 11). The counter control unit 124 in the CPU 12 manages counter values of the counters 18. A value of the counter 18 is incremented by 1 by the counter control unit 124 when data is written to the MPS area of the host memory 22.

In the present embodiment, the above-described MAC is used to detect destruction and tampering of data. The controller 4 generates a MAC value for each MPS area. The MAC value is generated by the MAC value generation circuit 16. The MAC value generation circuit 16 includes a pseudo-random number generation circuit (not illustrated). The MAC value generation circuit 16 randomizes a counter value of the counter 18 corresponding to an MPS area with a pseudo-random number generation circuit. The counter value is incremented by 1 in response to writing data. The CPU 12 generates the MAC value by inputting the generated random number and the data stored in the MPS area to the MAC value generation circuit 16. The MAC value generation circuit 16 transmits the generated MAC value to the CPU 12. The MAC value is managed in association with each MPS area. The MAC value is stored in the host memory 22.

The counter control unit 124 increments a corresponding counter value when data is written to the host memory 22. The MAC value is updated each time the counter value of the counter in the corresponding MPS area is updated.

Figure 12:
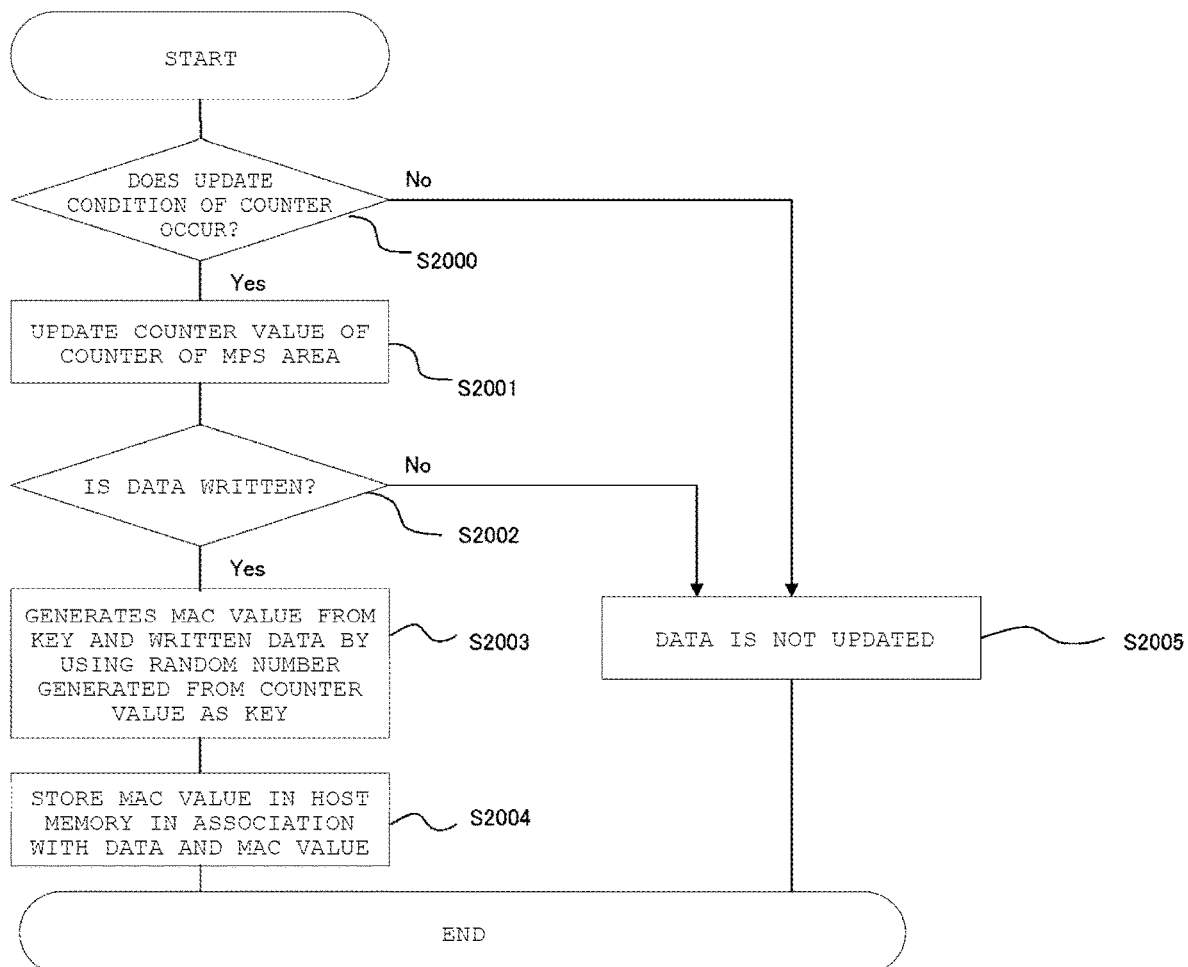
FIG. 12 is a flowchart of an example of a procedure for generating the MAC value performed by the electronic device according to the first embodiment.

FIG. 12 is a flowchart of generating a MAC value. The CPU 12 checks whether or not an update condition of a counter occurs (step S2000). When the update condition does not occur (step S2000_No), data is not updated (step S2005), and the CPU 12 does not generate the MAC value. When the update condition occurs (step S2000_Yes), a counter value of the counter set in an MPS area is updated (step S2001). The update condition of the counter includes that data is written in the MPS area, that the data of the MPS area is updated, and that power state of the electronic device 3 is changed. The CPU 12 checks whether or not data is written (step S2002). When there is no update of a counter value due to write of data (step S2002_No), data to be written does not exist, and data is not updated (step S2005), and thus, the CPU 12 does not generate a MAC value. When there is an update due to write of data (S2002_Yes), the CPU 12 generates a MAC value from a key and data by using a random number generated from the counter value as the key (S2003). The CPU 12 stores the MAC value in the host memory 22 in association with the data and the MAC value (S2004).

Returns to FIG. 10. The host memory address translator 15 adds a counter value of the counter 18 corresponding to a certain MPS area to an entry which is in the host memory address conversion table 151 and corresponds to the MPS area.

Figure 16:
FIG. 16 illustrates an example of a host memory address conversion table used in the electronic device according to the first embodiment.

FIG. 16 illustrates an example of the host memory address conversion table 151. The host memory address conversion table 151 is configured by adding a counter field to the host memory address conversion table 151 described above with reference to FIG. 4.

In an entry corresponding to a certain MPS area, the counter field indicates a counter value of the counter 18 corresponding to the MPS area. When receiving an internal address to which data is to be written or an internal address from which data is to be read from the host memory control unit 123 of the CPU 12, the host memory address translator 15 specifies an entry which is in the host memory address conversion table 151 and corresponds to the internal address. The host memory address translator 15 determines a host address corresponding to the internal address and the counter 18 from the specified entry. When the host memory address translator 15 receives the internal address to which data is to be written, the counter control unit 124 increments a counter value of the determined counter 18 by 1 and sets the counter value to the MAC value generation circuit 16.

When the host memory address translator 15 receives the internal address from which data is to be read, the counter control unit 124 sets a counter value of the counter 18 corresponding to the internal address to the MAC value generation circuit 16. In the example illustrated in FIG. 16, six different counter values (here, counter 1, counter 2, . . . , counter 6) are set to MAC value fields, in a plurality of entries corresponding to a plurality of MPS areas.

Figure 13:
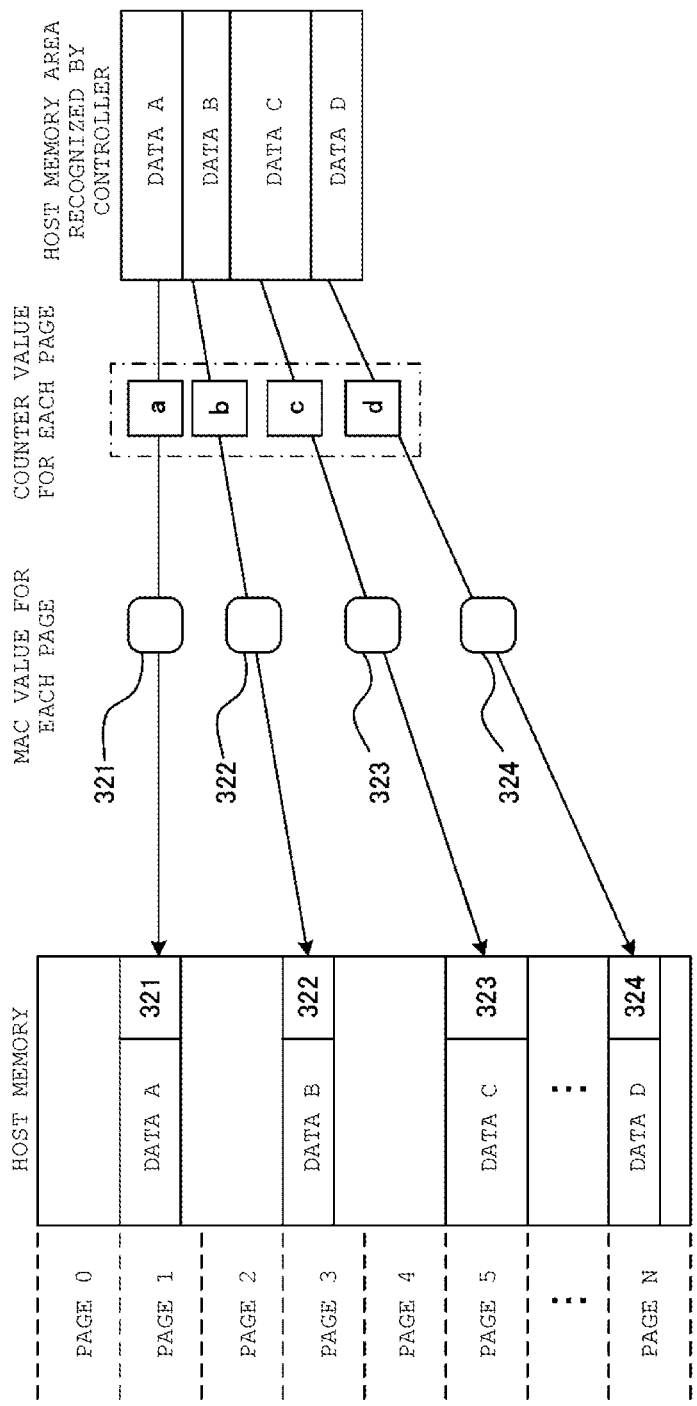
FIG. 13 illustrates an example in which the MAC value is associated with data stored in a host memory by the electronic device according to the first embodiment.

Write of data to a host memory will be described more specifically with reference to an example illustrated in FIG. 13.

For example, when the host memory control unit 123 writes data A to a first internal address of the HM_mapped area 17, the host memory address translator 15 determines a first host address corresponding to the first internal address by using the host memory address conversion table 151. The host memory address translator 15 determines the page 1 which is an MPS area and corresponds to the first host address. Then, the host memory address translator 15 determines the counter 18 from entries of the host memory address conversion table 151 corresponding to the page 1.

The counter control unit 124 increments a counter value of the counter 18 corresponding to the page 1 by 1 and sets the counter value as a counter value a. The counter control unit 124 sets the counter value a to the MAC value generation circuit 16. The MAC value generation circuit 16 generates the MAC value 321 by using the set counter value a and the data A. The host memory control unit 123 transmits each of the first host address, the data A, and the MAC value 321 to the host 2 through the host I/F 11, and the data A and the MAC value 321 are written to the page 1 corresponding to the first host address.

Figure 14:
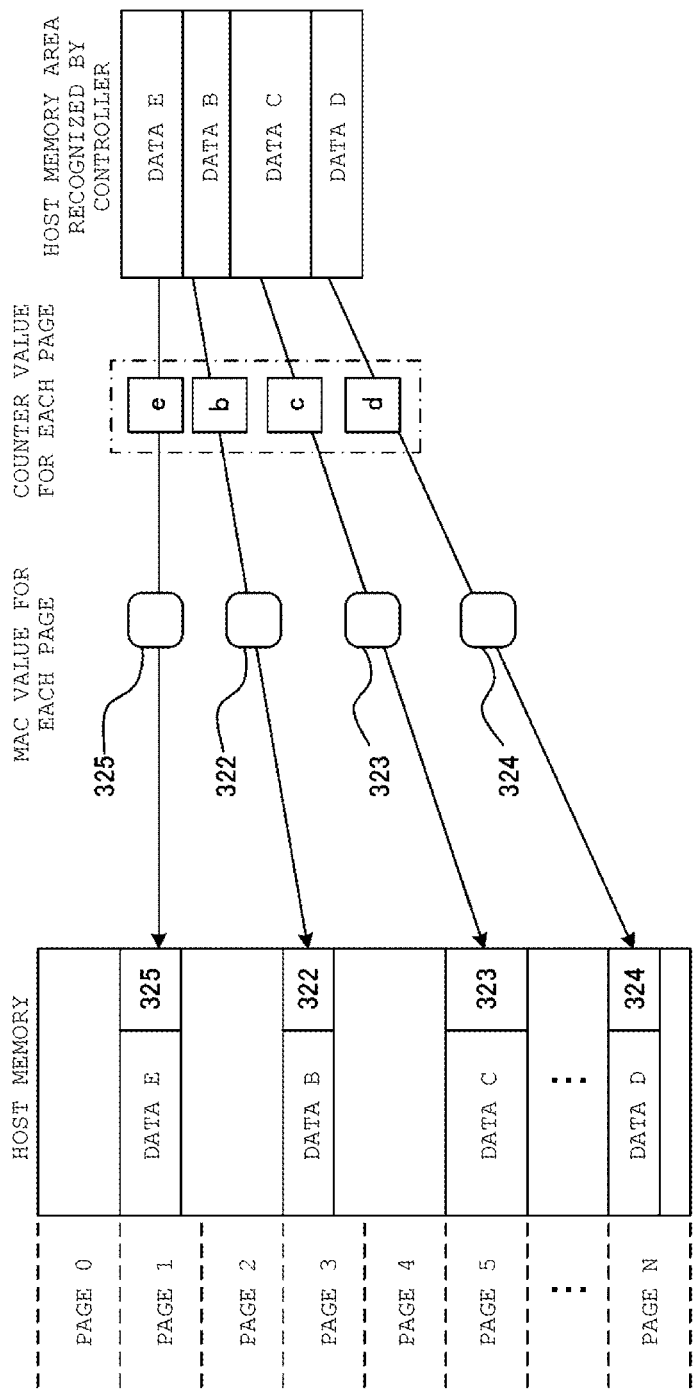
FIG. 14 illustrates an example in which the MAC value is associated with the data stored in the host memory by the electronic device according to the first embodiment.

Further, FIG. 14 illustrates, for example, a case where data E is overwritten in the page 1. When the host memory control unit 123 writes the data E to the first internal address of the HM_mapped area 17, the host memory address translator 15 determines the page 1 which is an MPS area corresponding to the first host address by using the host memory address conversion table 151. Then, the host memory address translator 15 determines the counter 18 from the entries of the host memory address conversion table 151 corresponding to the page 1 and transmits the counter 18 to the CPU 12. The counter control unit 124 increments a counter value of the counter 18 corresponding to the page 1 by 1 and sets the counter value as a counter value e. The counter control unit 124 sets the counter value e to the MAC value generation circuit 16. The MAC value generation circuit 16 generates a MAC value 325 by using the set counter value e and the data E. The host memory control unit 123 transmits each of the first host address, the data E, and the MAC value 325 to the host 2 through the host I/F 11, and the data E and the MAC value 325 are written to the page 1 corresponding to the first host address.

Further, read of data from a host memory will be described more specifically with reference to an example illustrated in FIG. 15.

Figure 15:
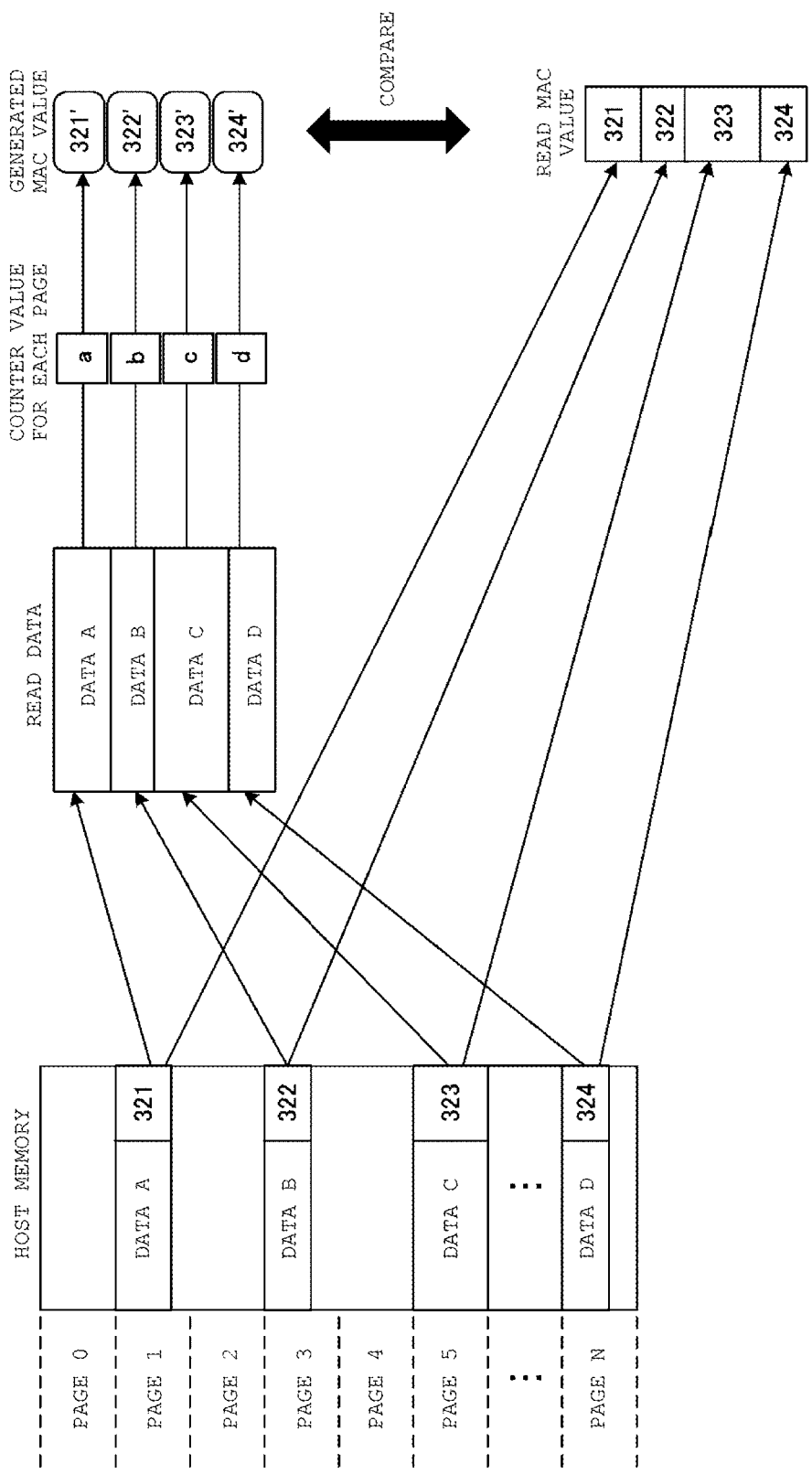
FIG. 15 illustrates an example in which the electronic device according to the first embodiment reads the data stored in the host memory.

In FIG. 15, the data A is written in the page 1. When the host memory control unit 123 reads data from the first internal address of the HM_mapped area 17, the host memory address translator 15 determines the first host address corresponding to the first internal address by using the host memory address conversion table 151.

The host memory address translator 15 transmits the first host address to the CPU 12. The CPU 12 reads the data A and the MAC value 321 from the page 1 corresponding to the first host address by transmitting the first host address to the host 2 through the host I/F 11. Further, the host memory address translator 15 determines the counter 18 from the entries of the host memory address conversion table 151 corresponding to the page 1. The counter control unit 124 reads the counter value a from the determined counter 18 and sets the counter value a to the MAC value generation circuit 16. The MAC value generation circuit 16 generates a MAC value 321' by using the counter value a of the counter 18 corresponding to the page 1 and the read data A. The CPU 12 compares the generated MAC value 321' with the MAC value 321 read from the host memory 22 and treats the data A as correct data if the generated MAC value 321' matches the MAC value 321. If the generated MAC value 321' does not match the MAC value 321, the electronic device 3 does not respond to a command from the host thereafter.

As described above, the controller 4 writes the data A to the first internal address of the HM_mapped area 17 and reads the data A from the first internal address.

Further, for example, a case where the host memory control unit 123 writes the data B to a second internal address of the HM_mapped area 17 will be described with reference to FIG. 13. The host memory address translator 15 determines a second host address corresponding to the second internal address by using the host memory address conversion table 151. The host memory address translator 15 determines the page 3 which is an MPS area and corresponds to the second host address. Then, the host memory address translator 15 determines the counter 18 from the entries of the host memory address conversion table 151 corresponding to the page 3.

The counter control unit 124 increments a counter value of the counter 18 corresponding to the page 3 by 1 and sets the counter value as a counter value b. The counter control unit 124 sets the counter value b to the MAC value generation circuit 16. The MAC value generation circuit 16 generates the MAC value 322 by using the set counter value b and the data B. The host memory address translator 15 transmits the second host address to the CPU 12. The CPU 12 transmits each of the second host address, the data B, and the MAC value 322 to the host 2 through the host I/F 11. The data B and the MAC value 322 are written to the page 3 corresponding to the second host address.

Further, a case where the host memory control unit 123 reads the data B from the second internal address of the HM_mapped area 17 will be described with reference to FIG. 15. When the host memory control unit 123 reads data from the second internal address of the HM_mapped area 17, the host memory address translator 15 determines the second host address corresponding to the second internal address by using the host memory address conversion table 151.

The host memory address translator 15 transmits the second host address to the CPU 12. The CPU 12 reads the data B and the MAC value 322 from the page 3 corresponding to the second host address by transmitting the second host address to the host 2 through the host I/F 11. Further, the host memory address translator 15 determines the counter 18 from the entries of the host memory address conversion table 151 corresponding to the page 3. The counter control unit 124 read the counter value b from the determined counter 18 and sets the counter value b to the MAC value generation circuit 16. The MAC value generation circuit 16 generates a MAC value 322' by using the counter value b of the counter 18 corresponding to the page 3 and the read data B. The CPU 12 compares the generated MAC value 322' with the MAC value 322 read from the host memory 22 and treats the data B as correct data if the generated MAC value 322' matches the MAC value 322.

The read MAC value may be stored in the buffer memory 14 which does not receive interference from the host or may be stored in a place where does not receive interference from a host other than the buffer memory 14. If the generated MAC value 322' does not match the MAC value 322, the electronic device 3 does not respond to a command from the host thereafter.

As described above, the controller 4 writes the data B to the second internal address of the HM_mapped area 17 and reads the data B from the second internal address.

The same applies to a case where the data C and the data D are written to the HM_mapped area 17 and a case where the page 5 and the page N of the host memory are accessed to read the data C and the data D from the HM_mapped area 17.

Further, the MAC values are stored in the host memory 22 in association with the respective MPS areas in the host memory 22. When the data A, B, C, and D are stored in the page 1, the page 3, the page 5, and the page N in the host memory 22, the MAC values 321, 322, 323, and 324 corresponding to the data A, B, C, and D are stored in the page 1, the page 3, the page 5, and the page N in the host memory 22, respectively. The MAC values may be independently stored in areas provided as MAC value areas in the host memory 22 or may be stored in a page in which the associated data is stored.

In this way, the electronic device 3 uses a random number generated from a counter value for each MPS area in the host memory address conversion table 151 as a key. The electronic device 3 generates the MAC value by using the key and data to be written. The generated MAC value is stored in the host memory 22 in association with the data to be written.

Accordingly, even when the data and the MAC value written in another MPS area are copied in a certain MPS area and tampered with, keys used when the MAC value is generated in each area are different from each other. The controller 4 can detect the tampering when the MAC value of the read data is checked. For example, when the data A and the MAC value 321 stored on the page 1 are copied to the page 3 and tampered with, the MAC value 321 of the page 1 is different from the MAC value 322 of the page 3. This is because a key used when generating a MAC value corresponding to data of the page 1 in a host memory is different from a key used when a controller reads data of the page 3 and regenerates the MAC. Accordingly, the controller 4 can detect that the data A read from the page 3 is tampered data or destroyed data.

Furthermore, even when the data and MAC value written in the current page N are tampered with by copying the data and MAC value written in the MPS area in the past, the generated MAC value does not match the read MAC values at the time of reading. This is because the MAC value is generated based on not only data but also a counter value which varies each time the data is written. Thus, it is possible to detect incorrect rewriting of data to the host memory 22 and to enhance security when the host memory 22 is used. Security can be enhanced without causing a malfunction of the electronic device 3 due to tampering.

Figure 17:
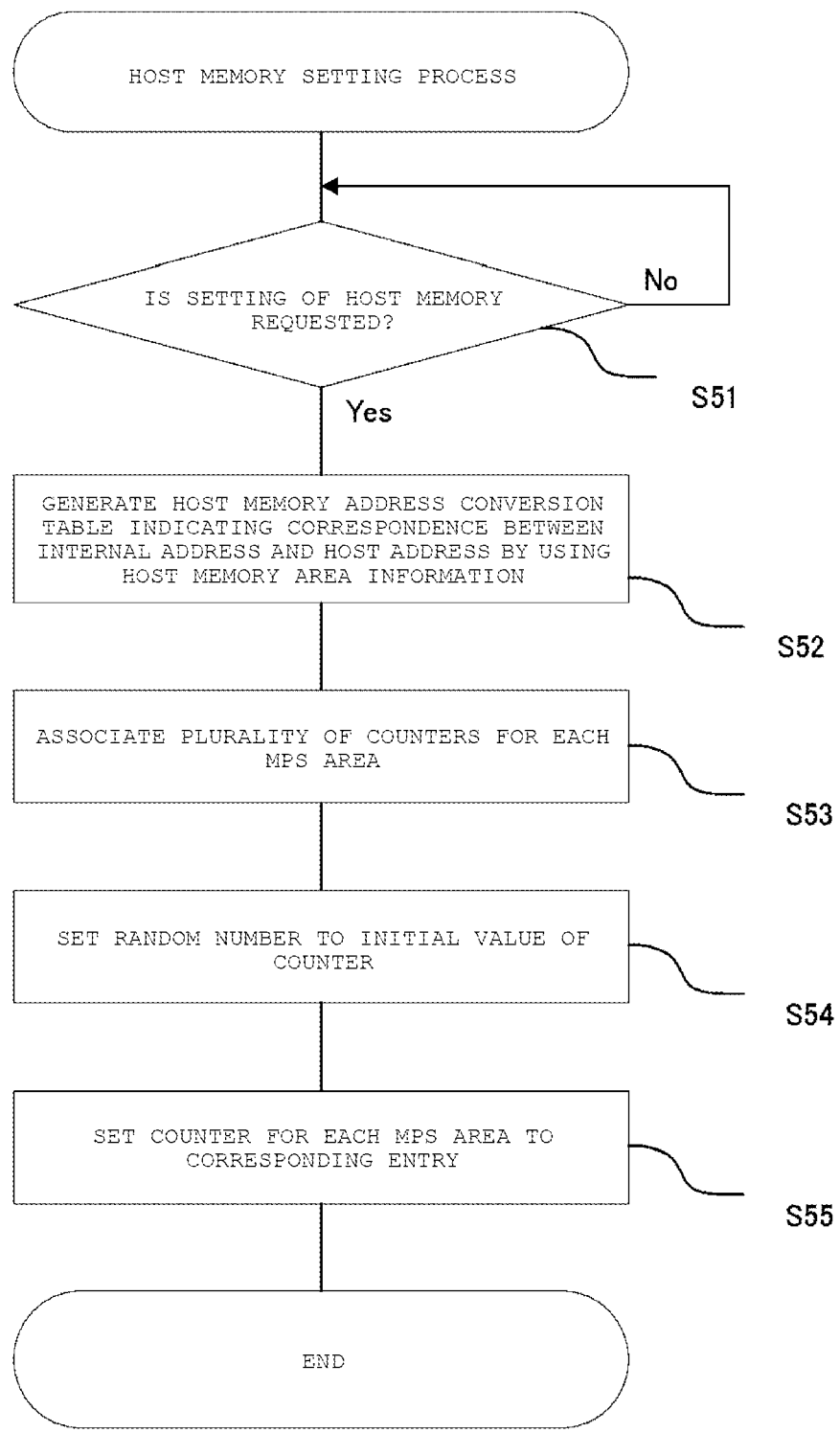
FIG. 17 is a flowchart of an example of a procedure of a host memory setting process performed by the electronic device according to the first embodiment.

A flowchart of FIG. 17 illustrates an example of a procedure of setting of a host memory performed by the controller 4 and a setting process of a counter. The procedure of step S51 and step S52 in the host memory setting process is the same as the procedure of step S11 and step S12 of the host memory setting process described above with reference to FIG. 5, respectively.

After the host memory address conversion table 151 is generated in step S52, the controller 4 associates a plurality of counters 18 for each MPS area (step S53). The counter control unit 124 sets a random number to an initial value of the counter 18 (step S54). Then, the controller 4 adds the counter 18 for each MPS area to an entry corresponding to the corresponding area in the host memory address conversion table 151 (step S55).

As described above, the controller 4 can generate the host memory address conversion table 151 including information on the counter 18 for each MPS area.

Figure 18:
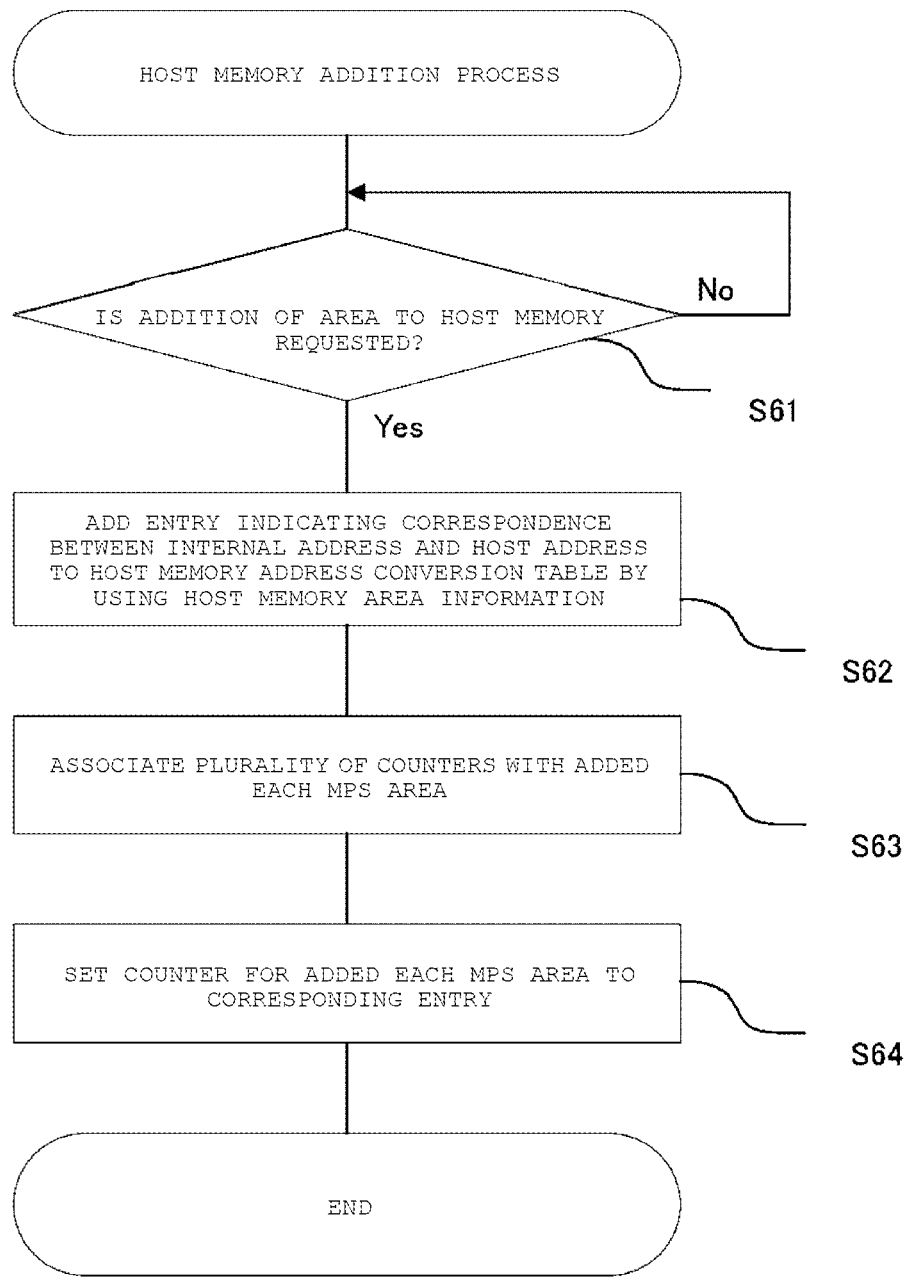
FIG. 18 is a flowchart of an example of a procedure of host memory addition process performed by the electronic device according to the first embodiment.

A flowchart of FIG. 18 illustrates an example of a procedure of setting of a host memory performed by the controller 4 and an addition process of setting of a counter. The procedure of step S61 and step S62 of a host memory addition process is the same as the procedure of step S21 and step S22 of the host memory addition process described above with reference to FIG. 6, respectively.

After an entry including address conversion information is added to the host memory address conversion table 151 in step S62, the controller 4 associates a plurality of counters 18 with each MPS area to which the corresponding address conversion information is added (step 363). Then, the controller 4 adds the counter 18 for each MPS area to an entry corresponding to the area in the host memory address conversion table 151 (step S64).

As described above, an entry including address conversion information corresponding to an area added to the host memory 22 can be added to the host memory address conversion table 151, and the counter 18 corresponding to each area of the added MPS can be added.

Figure 19:
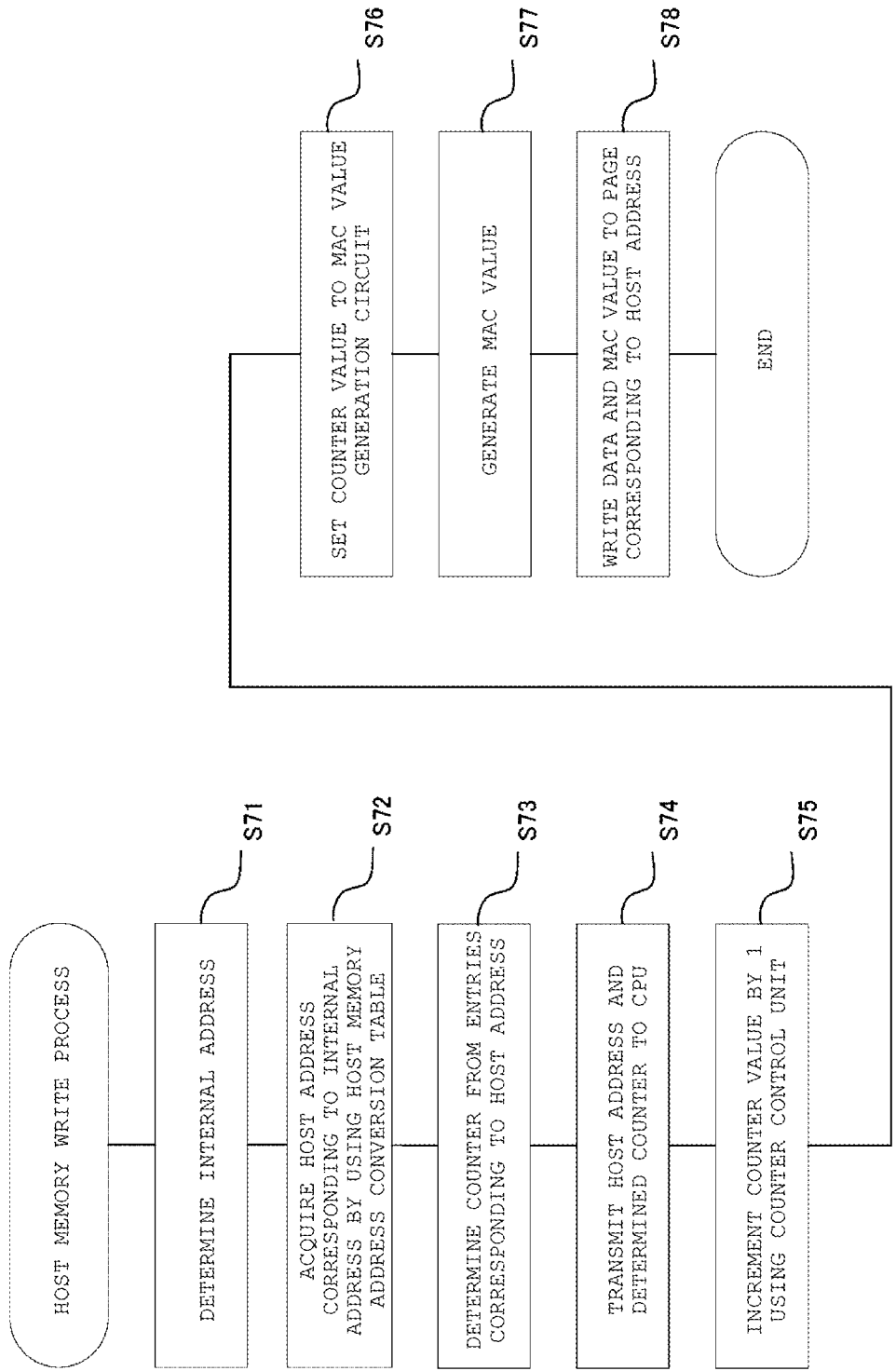
FIG. 19 is a flowchart of an example of a procedure of a host memory write process performed by the electronic device according to the first embodiment.

A flowchart of FIG. 19 illustrates an example of a procedure of a host memory write process performed by the controller 4. The procedure of step S71 and step S72 of the host memory write process is the same as the procedure of step S31 and step S32 of the host memory write process described above with reference to FIG. 7, and thus the description thereof is omitted.

The host memory address translator 15 determines the counter 18 from entries of the host memory address conversion table 151 corresponding to a host address (step 373). The host memory address translator 15 transmits a host address and a counter value of the counter 18 to the CPU 12 (step S74). The counter control unit 124 increments the counter value of the determined counter by 1 (step 375). The counter control unit 124 sets the counter value incremented by 1 to the MAC value generation circuit 16 (step S76). The CPU 12 uses a random number generated from the counter value as a key, and the MAC value generation circuit 16 generates a MAC value from the key and data to be written (step S77). The CPU 12 transmits the host address, the data, and the MAC value to the host I/F 11, and the data and the MAC value are written to a page corresponding to the host address (step S78).

Figure 20:
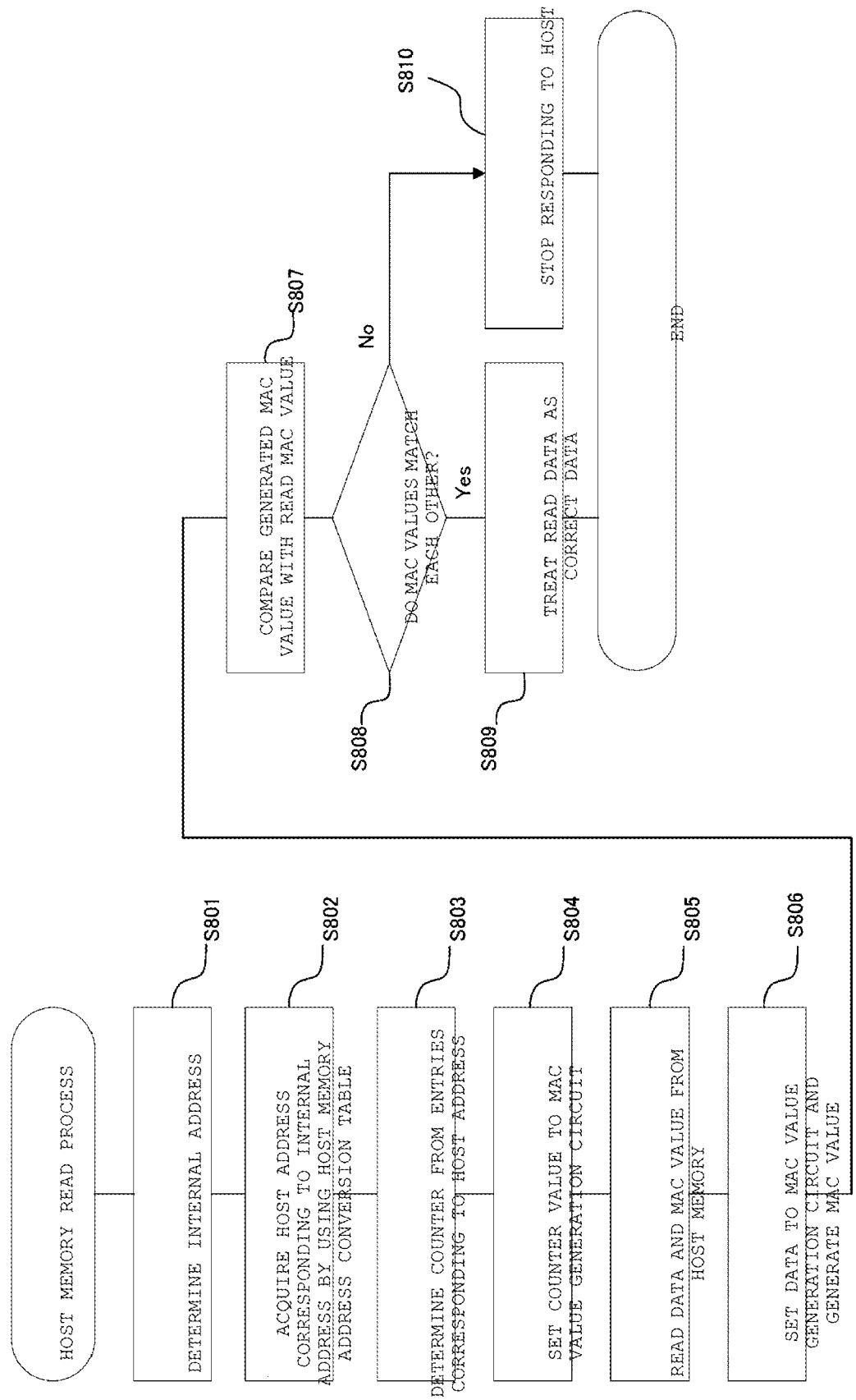
FIG. 20 is a flowchart of an example of a procedure of a host memory read process performed by the electronic device according to the first embodiment.

A flowchart of FIG. 20 illustrates an example of a procedure of a host memory read process performed by the controller 4. The procedure of step S801 and step S802 of the host memory read process is the same as the procedure of step S41 and step S42 of the host memory read process described above with reference to FIG. 8, and thus the description thereof is omitted.

The host memory address translator 15 acquires the counter 18 from the entries of the host memory address conversion table 151 corresponding to a host address (step S803). Then, the counter control unit 124 sets a counter value of the determined counter 18 to the MAC value generation circuit 16 (step S804). The CPU 12 reads data and a MAC value according to the host address (step S805). The MAC value generation circuit 16 generates the MAC value by using the data and the counter value (step S806). The CPU 12 compares the generated MAC value with the MAC value read from the host memory 22 (step S807). If the generated MAC value matches the read MAC value (step S808_Yes), the CPU 12 treats the read data as correct data (step S809). The read MAC value may be stored in the buffer memory 14 that does not receive interference from a host or may be stored in a place where does not receive the interference from the host other than a buffer memory. If the generated MAC value does not match the read MAC value (step S808_No), the CPU 12 determines that the read data is not correct, and thereafter, the electronic device 3 does not respond to an instruction of the host 2 (step S810).

As described above, the electronic device 3 stores a MAC value corresponding to data of an MPS area in the host memory 22 by using a counter value for each MPS area. Thereby, it is possible to enhance security when the host memory 22 is used.

First Modification Example

The counter 18 in the controller 4 is duplicated and stored in the internal storage 5 for accuracy of a value of the counter 18.

Figure 21:
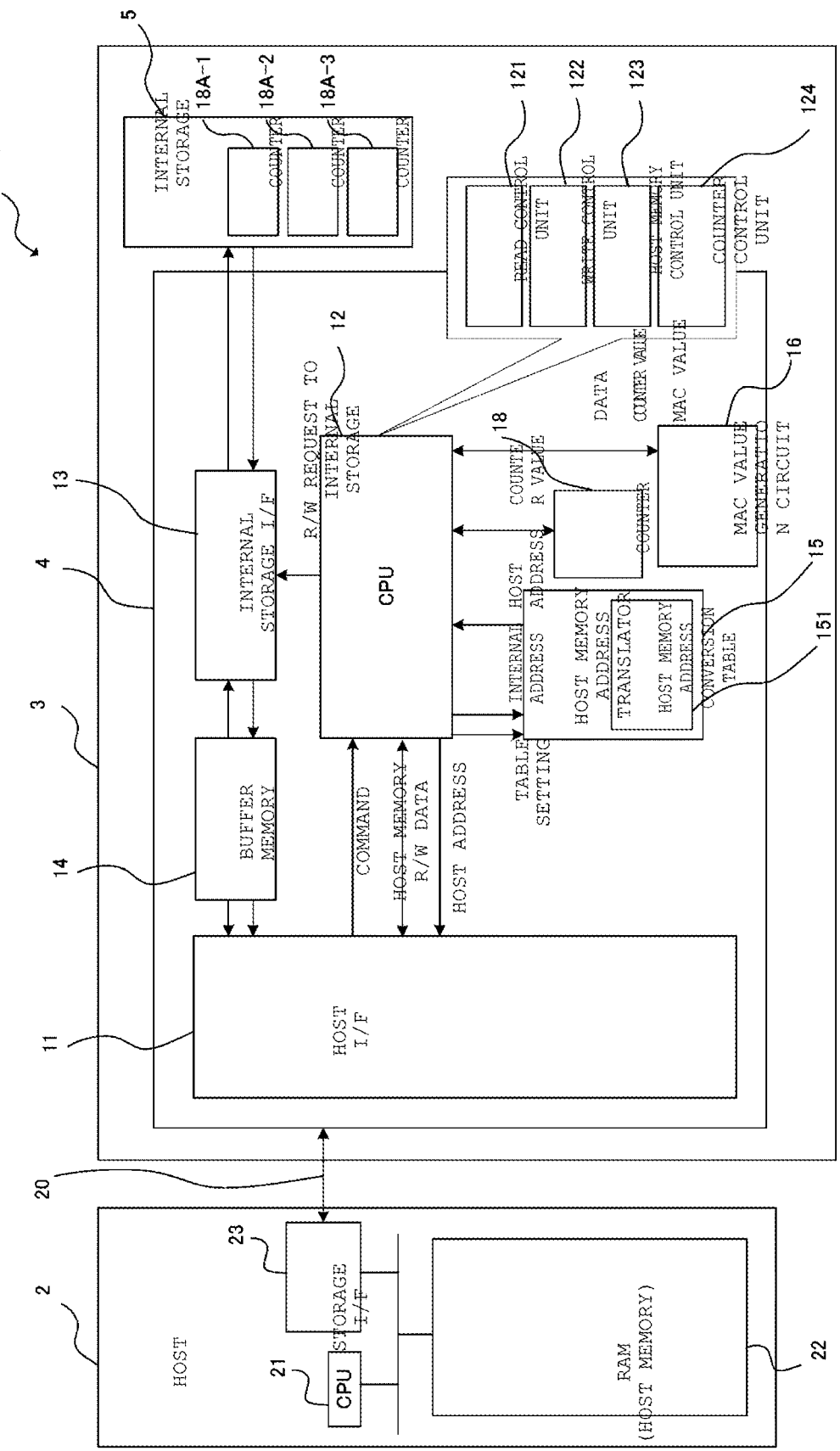
FIG. 21 illustrates a block diagram of an information processing system including an electronic device according to a first modification example of the first embodiment.

FIG. 21 illustrates a configuration example of the electronic device 3 according to a first modification example. The electronic device 3 includes a plurality of counters 18A-1, 18A-2, and 18A-3 stored in the internal storage 5 by duplicating the counter 18, as compared with the electronic device 3 of the first embodiment. Specifically, a plurality of counter value storage areas are included in each MPS area.

The counter control unit 124 of the first modification example sets a random number to an initial value of the counter 18 when the electronic device 3 is initially supplied with power. Further, when data is written to the MPS area, when the data of the MPS area is updated, or when power state of the electronic device 3 is changed, the counter control unit 124 updates a counter value of the counter 18 in the controller 4. At the same time, counter values of the counters 18A-1, 18A-2, and 18A-3 are also updated.

When the electronic device 3 is powered on for the second time or later, when the electronic device 3 is recovered from a power saving state, or when the host 2 initializes the host memory 22, the counter control unit 124 checks the counter values stored in the internal storage 5. The counter control unit 124 determines whether or not all counter values of the plurality of counters 18A-1, 18A-2, and 18A-3 in the internal storage 5 corresponding to the counter 18 are equal to each other. When the counter values are equal to each other, counter values incremented by 1 are adopted as values of the counter 18. When the counter values are not equal to each other, a counter value that has a maximum value by being incremented by 1 among the counter values of the counters 18A-1, 18A-2, and 18A-3 is adopted as the value of the counter 18. The counter control unit 124 sets the adopted value to the counter 18. By set again the value incremented to the counter value (or the maximum value among the plurality of counter values) by being incremented by 1 before power state of the electronic device 3 is changed and the host memory 22 is initialized as a counter value, it is possible to avoid duplication of counter values before and after power state of the electronic device 3 is changed and before and after the host memory 22 is initialized.

When verifying the MAC values of the entries in the host memory address conversion table 151, the electronic device 3 refers to a plurality of counter values. The plurality of counter values can differ from each other due to a writing error of data or a changing of power state. For example, when the value of the counter 18 corresponding to one MPS area is updated, the values of the counters 18A-1, 18A-2, and 18A-3 in the internal storage 5 are also updated to become the same counter value. At this time, if there is a writing error of data or power of the internal storage 5 is turned off before the counter value is updated, the values of the counter 18 are not normally written to the counters 18A-1, 18A-2, and 18A-3. When the counter control unit 124 refers to the values of the counter 18 and the counters 18A-1, 18A-2, and 18A-3, and when the counter values are not equal to each other, the maximum value of the counter values of the counter 18 and the counters 18A-1, 18A-2, and 18A-3 is adopted as a correct counter value. The counter control unit 124 writes a number obtained by adding 1 to the adopted maximum value to the counter 18 and the counters 18A-1, 18A-2, and 18A-3 in the internal storage 5. That is, when the counter values of the plurality of counters 18 corresponding to one MPS area are not equal to each other, the counter control unit 124 aligns all of the plurality of counter values with a value obtained by incrementing the maximum value of the plurality of counter values by 1. When the MAC values are verified, the data in the host memory 22 of an area corresponding to the counter 18 is regarded as unreliable, thereby being discarded, at a point in time when the counter control unit 124 recognizes that there is a difference in the counter values of the counters 18A-1, 18A-2, and 18A-3.

Figure 22:
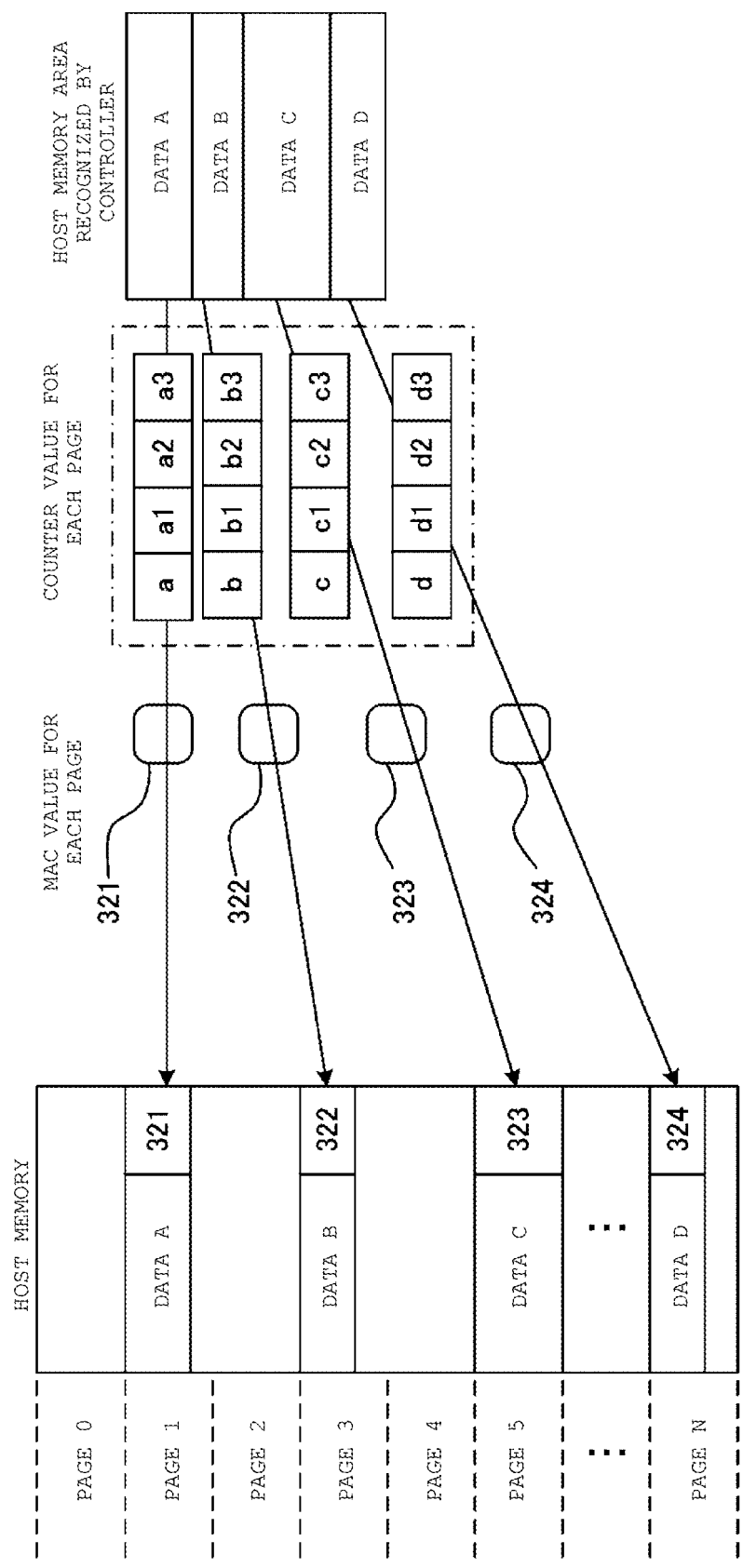
FIG. 22 is a diagram an example in which a MAC value is associated with data stored in a host memory by the electronic device according to the first modification example of the first embodiment.

More specific description will be given with reference to FIG. 22. For example, when the host memory control unit 123 writes the data A to a first internal address of the HM_mapped area 17, the host memory address translator 15 determines a first host address corresponding to the first internal address by using the host memory address conversion table 151. The host memory address translator 15 determines the page 1 which is an MPS area and corresponds to the first host address. Then, the host memory address translator 15 determines a plurality of counters 18, 18A-1, 18A-2, and 18A-3 from the entries of the host memory address conversion table 151 corresponding to the page 1 .

Of the plurality of counters, the counter 18 is provided in the controller 4, and the counters 18A-1, 18A-2, and 18A-3 are provided in the internal storage 5. The counter control unit 124 increments a value of the counter 18 of the controller 4 by 1, and then increments the counter values of the counters 18A-1, 18A-2, and 18A-3 of the internal storage 5 by 1. The counter control unit 124 compares counter values a, a1, a2, and a3 of the plurality of counters 18, 18A-1, 18A-2, and 18A-3 corresponding to the page 1 with each other and determines whether or not all the counter values of the plurality of counters are equal to each other. If all the counter values are not equal to each other, the electronic device 3 regards the data of the MPS areas corresponding to the counters 18, 18A-1, 18A-2, and 18A-3 is unreliable and discards the data. If all the counter values are the same value x, the counter control unit 124 sets the counter value x to the MAC value generation circuit 16. The MAC value generation circuit 16 generates the MAC value 321 by using the set counter value and the data A. The host memory address translator 15 transmits the first host address to the CPU 12. The CPU 12 transmits each of the first host address, the data A, and the MAC value to the host 2 through the host I/F 11. The data A and the MAC value 321 are written to the page 1 corresponding to the first host address.

Figure 23:
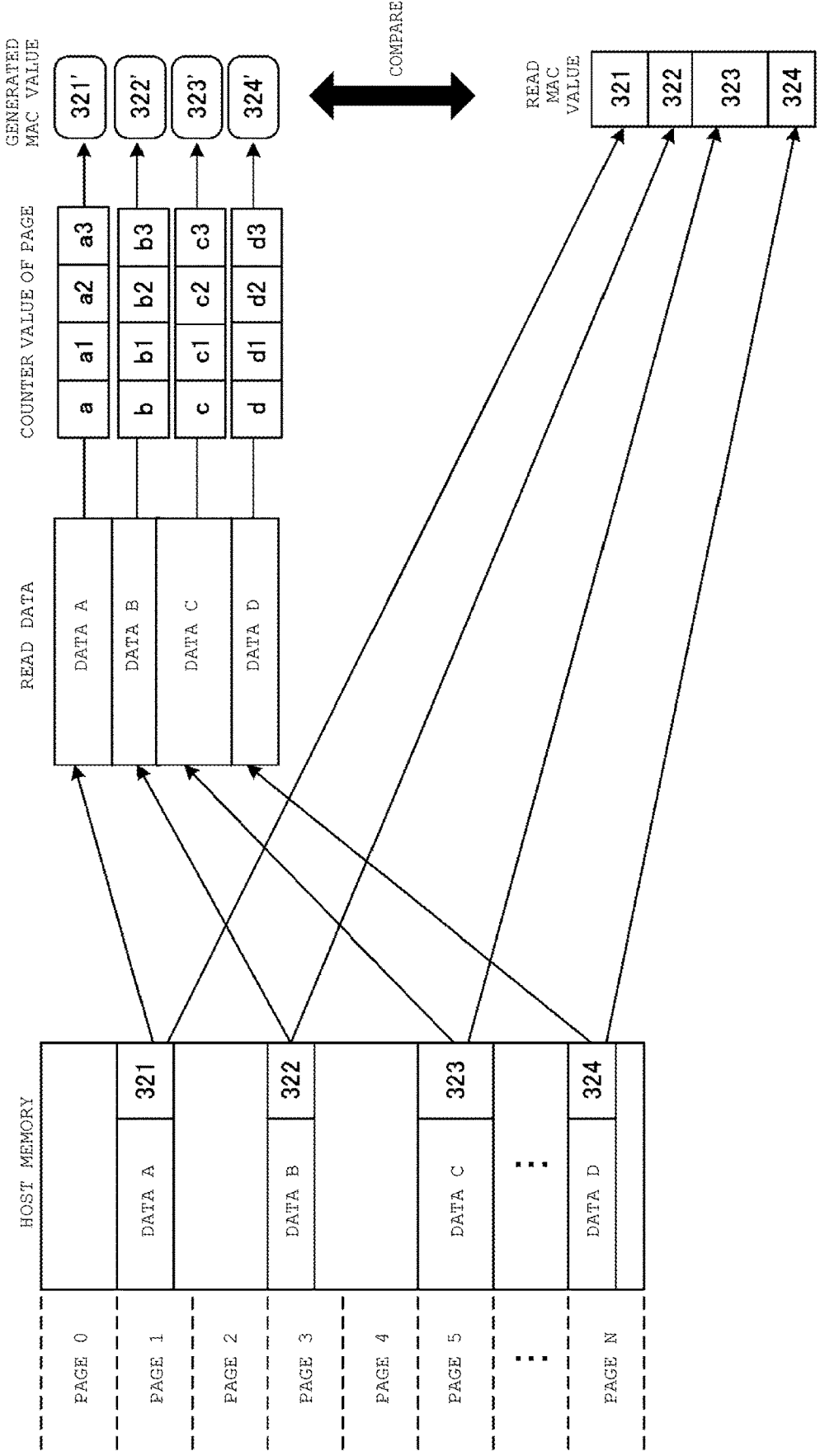
FIG. 23 illustrates an example in which the electronic device according to the first modification example of the first embodiment reads the data stored in the host memory.

Further, a case where the host memory control unit 123 reads data from the first internal address of the HM_mapped area 17 after the data A is written to the page 1 will be described with reference to FIG. 23. The host memory address translator 15 determines the first host address corresponding to the first internal address by using the host memory address conversion table 151.

The CPU 12 reads the data A and the MAC value 321 from the page 1 corresponding to the first host address by transmitting the first host address to the host 2 through the host I/F 11. The host memory address translator 15 acquires counter values of the plurality of counters 18, 18A-1, 18A-2, and 18A-3 corresponding to the first host address from an entry corresponding to the first host address. The counter control unit 124 reads the counter values a, a1, a2, and a3 of the plurality, of determined counters 18, 18A-1, 18A-2, and 18A-3 from the internal storage 5 to compare the counter values to each other and determines whether or not all the counter values of the plurality of counters are the same value x. If all the counter values are not the same value x, the electronic device 3 regards data of a corresponding MPS area as unreliable, thereby discarding the data. If all the counter values are the same value x, the counter control unit 124 sets the counter value x to the MAC value generation circuit 16. The MAC value generation circuit 16 generates a MAC value 321' by using the set counter value x and the read data A. The CPU 12 compares the generated MAC value 321' with the MAC value 321 read from the host memory 22 and treats the data A as correct data if the generated MAC value 321' matches the MAC value 321. If the generated MAC value 321' does not match the MAC value 321, the electronic device 3 does not respond to a command from the host thereafter.

The same applies to a case where the data B, the data C, and the data D are written to the HM_mapped area 17, and a case where the page 3, the page 5, and the page N of the host memory 22 is accessed to read the data B, the data C, and the data D from the HM_mapped area 17.

As described above, the electronic device 3 of the first modification example stores a MAC value corresponding to data of an MPS area in the host memory 22 by using a counter value for each MPS area. Further, by including a plurality of counter values, it is possible to exclude uncertain counter values and data, and to further enhance security when the host memory 22 is used.

Second Modification Example

In the first embodiment, a MAC is used to protect data. In a second modification example, an digital signature is used instead of the MAC. In the digital signature, a data transmitter outputs a signature by using a key, target data of which integrity is to be guaranteed, and a signature generation algorithm. The key is a private key and is unknown to anyone except the data transmitter. The data transmitter generates a public key that is paired with the private key and shares the public key with a data recipient. The public key may be shared before the data is transmitted or at the same time as the data is transmitted. The data transmitter transmits the data and the signature to the data recipient. The data recipient verifies whether or not the signature is correct by using the received data, the public key, the signature, and a verification algorithm. If the signature is correct, a transmitter who signs the data is guaranteed to be a valid transmitter with the private key corresponding to the public key. Further, data integrity is guaranteed.

In the second modification example, the private key and the public key are information that is stored in the electronic device 3 and is not publicized. The private key and public key are set during a manufacturing process of the electronic device 3, and each product has a unique key. When storing target data of which integrity is to be guaranteed in the host memory 22, the CPU 12 randomizes a value of a counter corresponding to a page saved in the data and assigns the value to the data. A signature is generated by data to which the randomized value is assigned and a private key stored in the electronic device 3. By assigning a randomized value of a counter to data, even when data to be written is the same, when a value of the counter value is updated, a signature of the data is surely different. The generated signature is stored in the host memory 22.

When reading data, verification is performed in the same manner as when data read from the host memory 22, a value of a counter corresponding to a page where data is saved, a signature, a public key, and target data used by a verification algorithm are stored in the host memory 22, as a result of the verification, if the signature is correct, the data is treated as correct data. If a random number or a signature assigned to data is not correct, the electronic device 3 does not respond to a command from a host thereafter.

As described above, the electronic device 3 of the second modification example stores a signature corresponding to data of an MPS area in the host memory 22 by using a counter value for each MPS area. Thereby, it is possible to enhance security when the host memory 22 is used.

Second Embodiment

In the first embodiment, one counter value and one MAC value are used for one MPS area to write data to the host memory 22, and the MAC value is used to check integrity of the data read from the host memory 22. In a second embodiment, when managing data of a certain size that requires use of a plurality of MPS areas, different MAC values are associated with each MPS area in the host memory 22. The MAC value is called a data protection MAC value. The CPU 12 generates a table by using the data protection MAC value and further sets MAC values in the table. A MAC value for protecting a table of data protection MAC values is called a MAC protection MAC value.

A configuration of the electronic device 3 according to the second embodiment is the same as the configuration of the electronic device 3 of the first embodiment. In the first embodiment, data stored in the host memory 22 has a size fitted to one MPS area and a data protection MAC value is generated for each MPS area, that is, for each data. The second embodiment is different from the first embodiment in that data stored in the host memory 22 has a size larger than one MPS area, and the host memory 22 has a plurality of data protection MAC values and the host memory 22 stores a data protection MAC value table 222 and a MAC protection MAC value corresponding to the data protection MAC value table 222. Hereinafter, only points different from the first embodiment will be described.

Figure 24:
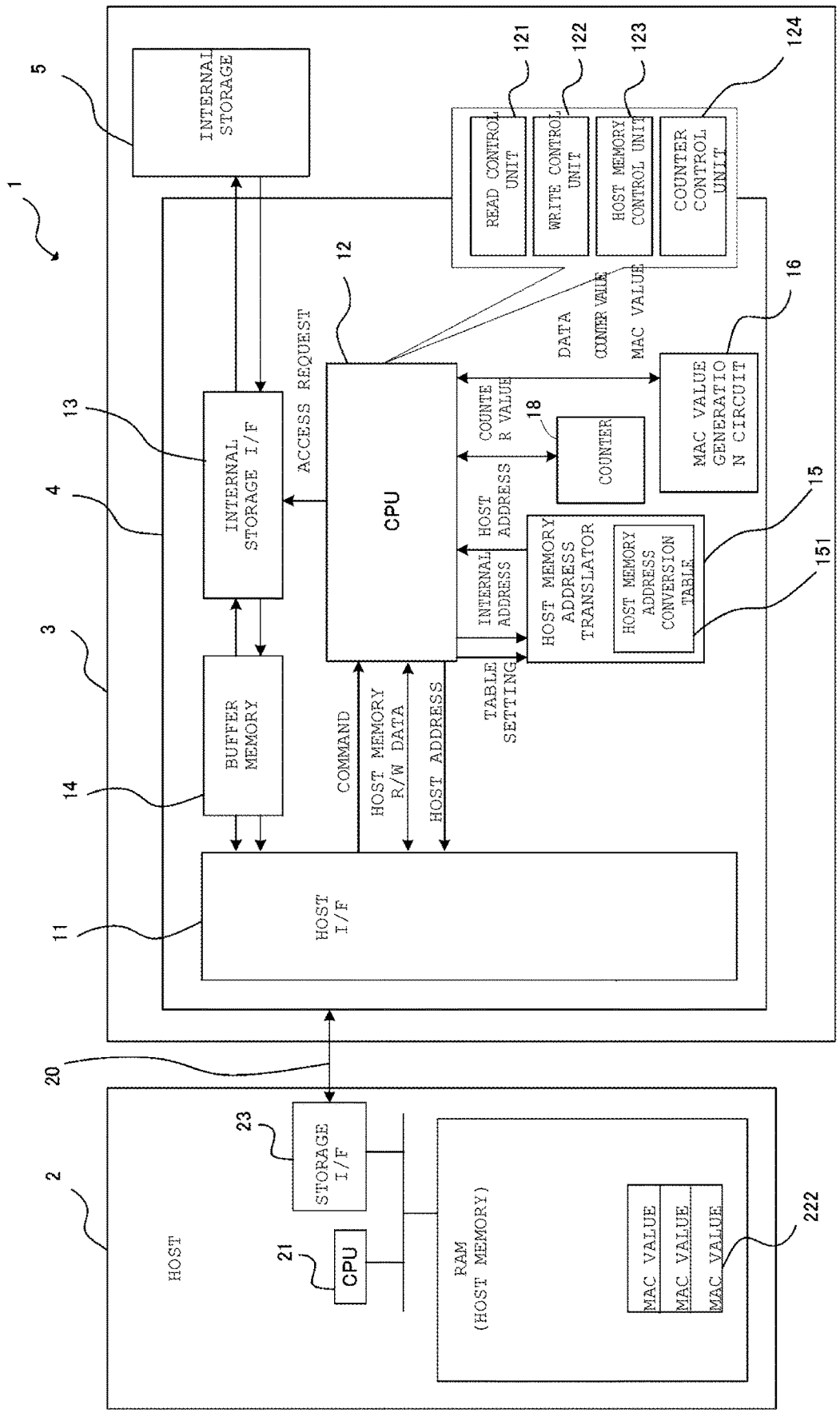
FIG. 24 illustrates a block diagram of an information processing system including an electronic device according to a second embodiment.

FIG. 24 is a block diagram of an information processing system according to the second embodiment. The information processing system according to the second embodiment includes the host memory 22 including the data protection MAC value table 222 of data having a size for a plurality of MPS areas as compared with the information processing system of the first embodiment. Specifically, a plurality of data protection MAC values of the data having the size for the plurality of MPS areas are generated for each MPS area.

The plurality of data protection MAC values are collectively written to a specific area in the host memory to become the data protection MAC value table 222. One data protection MAC value table 222 is stored in the host memory 22 in correspondence with one piece of data having the plurality of MPS areas. One counter 18 is allocated to one data protection MAC value table. The MAC protection MAC value corresponding to the data protection MAC value table 222 is generated by using a counter value of the counter 18.

A more specific description will be made with reference to an example illustrated in FIG. 25.

For example, a case where the host memory control unit 123 writes the data A corresponding to two MPS areas to the first internal address of the HM_mapped area 17 will be described. For example, assuming that the MPS area is 4 KB, a host address of the MPS area called a page 1 is HADDR0. Further, a page 3 is designated by a host address called HADDR1, a page 5 is designated by a host address called HADDR2, a page 6 is designated by a host address called HADDR2+4 KB, a page P is designated by a host address called HADDR15, and a page Q is designated by a host address called HADDR16. It is assumed that data A includes data A-1 and data A-2, the data A-1 is 3 KB, and the data A-2 is 2 KB. Data stored in a page is not limited to 4 KB. The host memory address translator 15 determines the first host address and a second host address corresponding to the first internal address by using the host memory address conversion table 151. The first host address and the second host address correspond to the page 1 and page 3 which are MPS areas. Then, the host memory address translator 15 acquires counter values of the host memory address conversion table 151 corresponding to the page 1 and page 3, respectively, and adds the counter values to entries. That is, the data A-1 is stored in the page 1 corresponding to the first host address, and the data A-2 is stored in the page 3 corresponding to the second host address. A counter value of the counter corresponding to the data A-1 is a, and a counter value of the counter corresponding to the data A-2 is b. Further, the host memory 22 includes the data protection MAC value table 222A of the data A. The data protection MAC value table 222A is configured to store data protection MAC values corresponding to the number of MPS areas used by the data A. The host memory address translator 15 determines a third internal address for storing the data protection MAC value table 222A corresponding to the page 1 and page 3. The host memory address translator 15 determines a fifth host address corresponding to the third internal address from the entries, and a page thereof is the page P. Further, the host memory address translator 15 determines a counter of the page P and adds the counter to the entry.

FIG. 26 illustrates an example of the host memory address conversion table 151. The page 1 is designated by a host address called HADDR0, the page 3 is designated by a host address called HADDR1, the page 5 is designated by a host address called HADDR2, the page 6 is designated by a host address called HADDR2+4 KB, the page P is designated by a host address called HADDR15, and the page Q is designated by a host address called HADDR16. When the data A is written to an area designated by host addresses called HADDR0 and HADDR1, the host memory control unit 123 determines that a counter of the data A is, for example, 010, and assumes that the data is valid data. Further, the host memory control unit 123 determines addresses of the data protection MAC value table 222A for storing the data protection MAC value of the data A as, for example, HADDR15 and HADDR15+y and adds the information to entries. Further, a host address for storing the MAC protection MAC value is determined to be, for example, HADDR15+z, and the address information is added to the entries.

Figure 25:
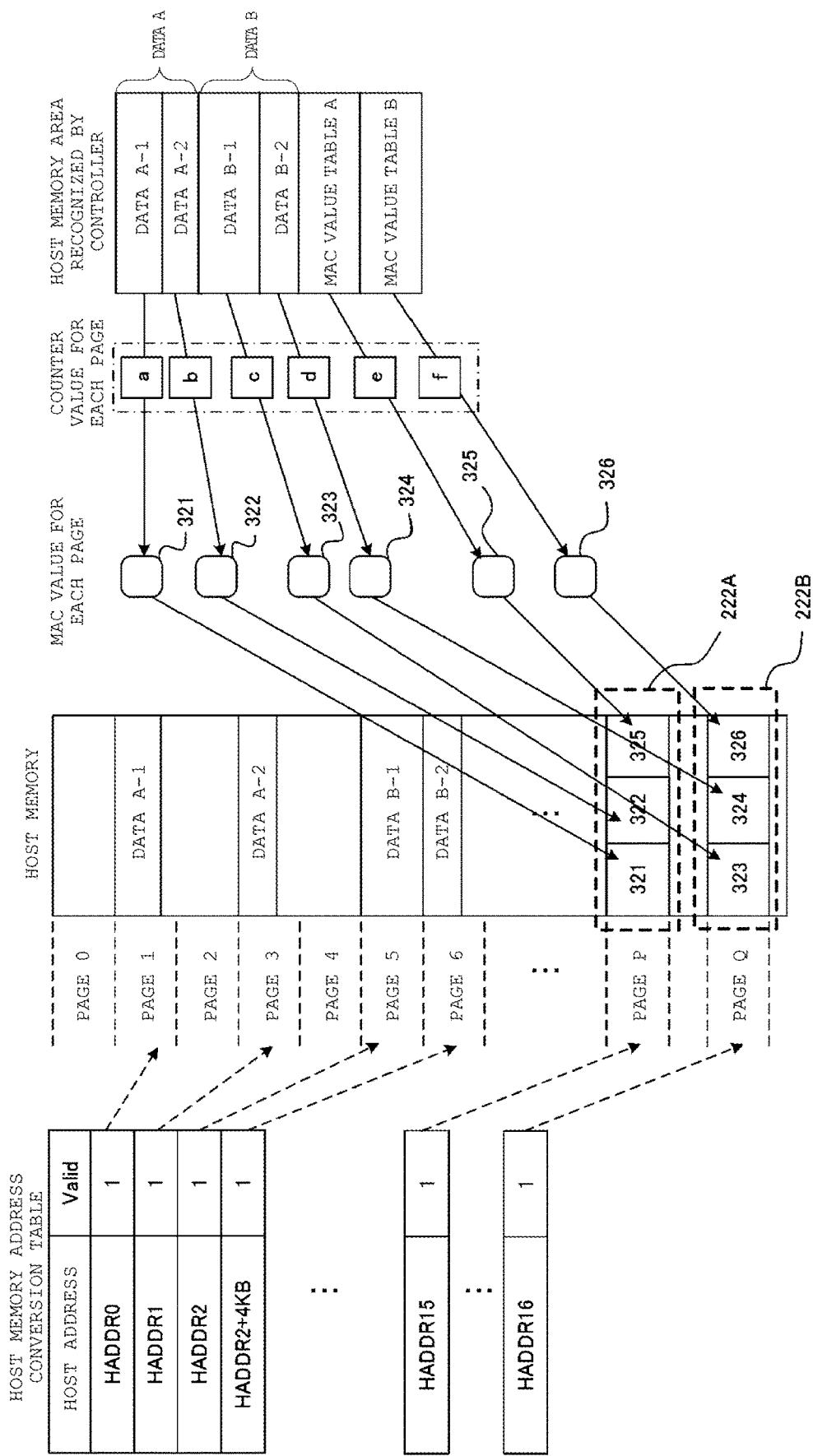
FIG. 25 illustrates an example in which a MAC value is associated with data stored in a host memory by the electronic device according to the second embodiment.

Returns to FIG. 25. In order to generate a MAC value of the data A-1, the counter control unit 124 increments a value of the counter corresponding to the page 1 by 1 and sets the value as a counter value a. The counter control unit 124 sets the counter value a to the MAC value generation circuit 16. The MAC value generation circuit 16 generates the MAC value 321 by using the set counter value a and the data A-1 transmitted from the CPU 12 and transmits the MAC value 321 to the CPU 12. Further, in order to generate a MAC value of the data A-2, the counter control unit 124 increments a value of the counter corresponding to the page 3 by 1, and sets the value as a counter value b. The counter control unit 124 sets the counter value b to the MAC value generation circuit 16. The MAC value generation circuit 16 generates the MAC value 322 by using the set counter value b and the data A-2 transmitted from, the CPU 12 and transmits the MAC value 322 to the CPU 12. The host memory address translator 15 transmits the first host address, the second host address, and the fifth host address to the CPU 12. The CPU 12 transmits the data A-1 and the data A-2 and two of the MAC values 321 and the MAC value 322 to the host 2 through the host I/F 11, respectively. The CPU 12 writes the data A-1 and the data A-2 to the page 1 and page 3 corresponding to the first host address and the second host address. The CPU 12 writes the data protection MAC value 321 and the data protection MAC value 322 to the data protection MAC value table 222A of the page P corresponding to the fifth host address.

Further, the CPU 12 sets the MAC protection MAC value to the data protection MAC value table. The host memory address translator 15 determines a counter corresponding to the page P by using the host memory address conversion table 151. The counter control unit 124 increments a value of the counter corresponding to the page P by 1 and sets the value as a counter value e. The counter control unit 124 sets the counter value e to the MAC value generation circuit 16. The MAC value generation circuit 16 generates the MAC protection MAC value 325 by using the set counter value e and the data protection MAC values 321 and 322 transmitted from the CPU 12 and transmits the MAC protection MAC value 325 to the CPU 12. The host memory address translator 15 transmits the fifth host address to the CPU 12. The CPU 12 transmits the MAC protection MAC value 325 to the host 2 through the host I/F 11. The CPU 12 writes the MAC protection MAC value 325 of the page P corresponding to the fifth host address to a data protection MAC value table 222A.

Figure 27:
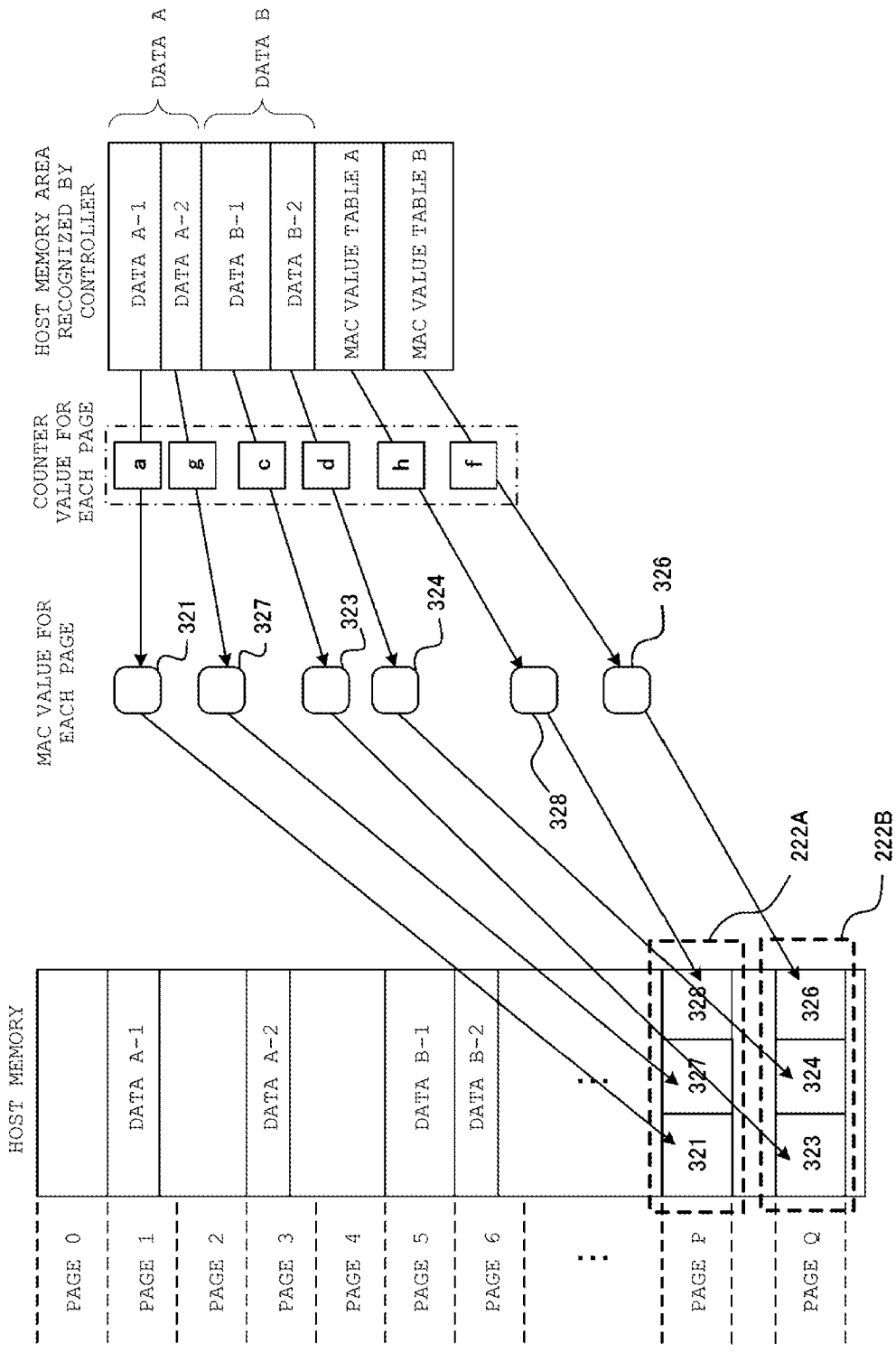
FIG. 27 illustrates an example in which a MAC value is associated with data stored in a host memory by the electronic device according to the second embodiment.

If the data protection MAC value is updated in response to updating the data or to updating the counter value, the MAC protection MAC value of the data protection MAC value table 222A is also updated. This will be described with reference to an example illustrated in FIG. 27. For example, if the data A-2 is updated, the counter control unit 124 increments a counter value by 1, and the counter value changes from b to g. The data protection MAC value 327 is updated in response to updating the counter value. The CPU 12 writes a new data protection MAC value 327 to the data protection MAC value table 222A through the host I/F 11. If the data protection MAC value 327 of the data protection MAC value table 222A is updated, the counter control unit 124 increments the data protection MAC value table 222A, that is, a counter value of the counter corresponding to the page P by 1. The counter value changes from e to h. The counter control unit 124 sets the incremented counter value h to the MAC value generation circuit 16. Further, the CPU 12 sets the data protection MAC value 321 and the data protection MAC value 327 of the data protection MAC value table 222A to the MAC value generation circuit 16 as data. The MAC value generation circuit 16 generates the MAC protection MAC value 328 and transmits the generated MAC protection MAC value 328 to the CPU 12. The CPU 12 writes the MAC protection MAC value 328 to the page P on which the data protection MAC value table 222A through the host I/F 11.

Figure 28:
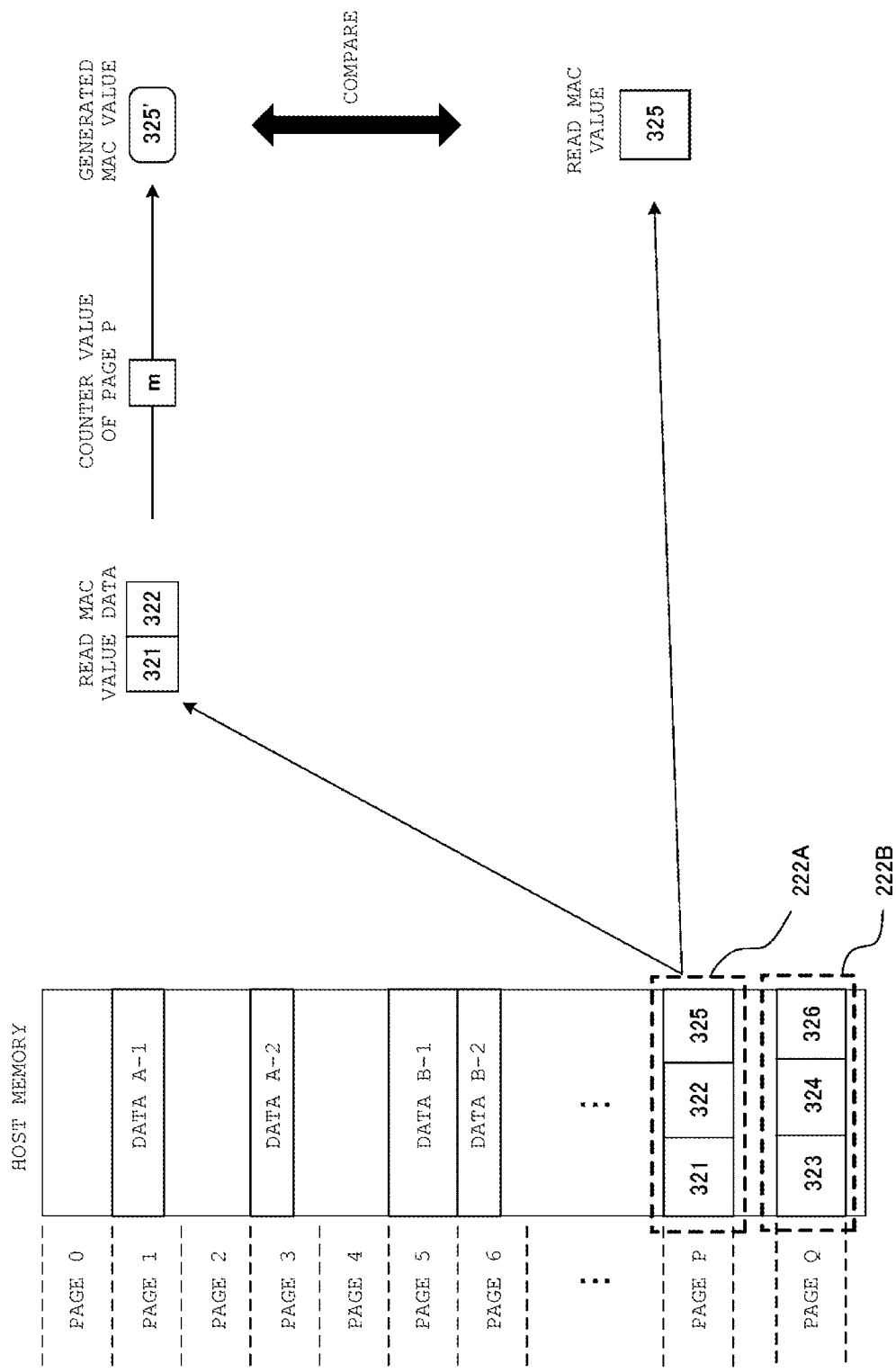
FIG. 28 illustrates an example in which the electronic device according to the second embodiment reads data stored in a host memory.

Read of data will be described. In FIG. 28, a case of reading the data A in a state where write to the page 1 and page 3 of data A is completed as described with reference to FIG. 25, will be described. When the host memory control unit 123 reads data from the first internal address of the HM_mapped area 17, the host memory address translator 15 determines the first host address and the second host address corresponding to the first internal address by using the host memory address conversion table 151. Further, the host memory address translator 15 determines a fifth host address to which the data protection MAC value table 222A of the data A is written with reference to entries of the host memory address conversion table 151.

The host memory address translator 15 transmits the fifth host address to the CPU 12. As the CPU 12 transmits the fifth host address to the host 2 through the host I/F 11, the data protection MAC values 321 and 322 and the MAC protection MAC value 325 are read from the page P corresponding to the fifth host address. The host memory address translator 15 acquires a counter of the page P which is the data protection MAC value table 222A from the entries of the host memory address conversion table 151. The counter control unit 124 sets a counter value m read from the counter of the page P to the MAC value generation circuit 16. The MAC value generation circuit 16 generates a MAC protection MAC value 325' by using the counter value m and the read data protection MAC value data 321 and 322. The CPU 12 compares the generated MAC protection MAC value 325' with the read MAC protection MAC value 325. If the MAC protection MAC values 325' and 325 do not match each other, the electronic device 3 does not respond to a command from the host thereafter. If the MAC protection MAC values 325' and 325 match each other, it is determined that the data protection MAC values 321 and 322 corresponding to the page 1 and page 3 are correct, and verification of the data protection MAC values 321 and 322 is performed.

Figure 29:
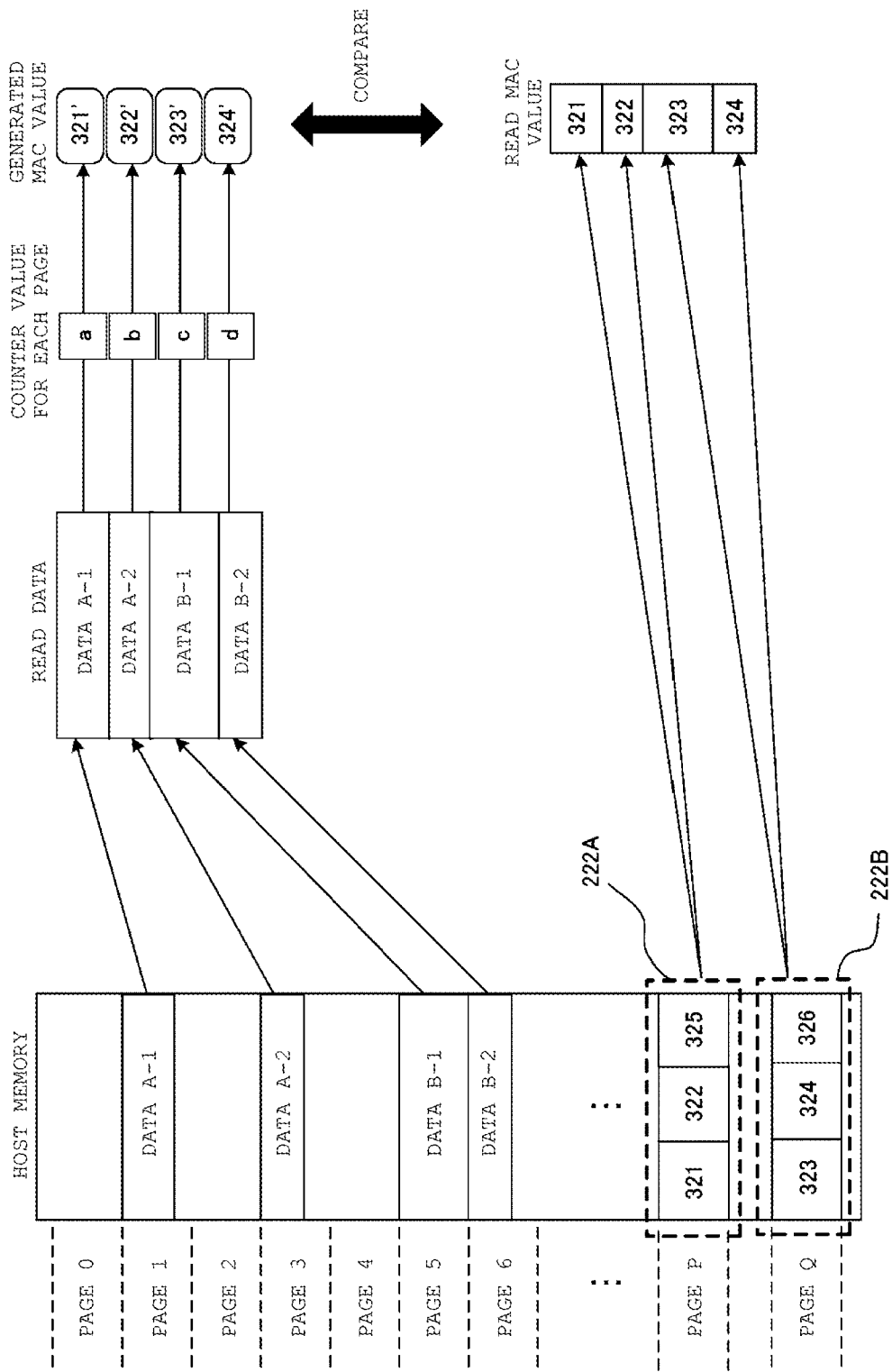
FIG. 29 illustrates an example in which the electronic device according to the second embodiment reads data stored in a host memory.

In FIG. 29, the host memory address translator 15 transmits the first host address and the second host address to the CPU 12. The CPU 12 transmits the first host address and the second host address to the host 2 through the host I/F 11. The data A-1 is read from the page 1 corresponding to the first host address and the second host address, and the data A-2 is read from the page 3. The host memory address translator 15 acquires the counters of the page 1 and page 3 from the entries of the host memory address conversion table 151. The counter control unit 124 sets the counter values a and b read from the counters of the page 1 and page 3 to the MAC value generation circuit 16. The MAC value generation circuit 16 generates the data protection MAC value 321' by using the counter value a and the read data A-1. Further, the MAC value generation circuit 16 generates the data protection MAC value 322' by using the counter value b and the read data A-2. The CPU 12 compares the generated data protection MAC value 321' and the data protection MAC value 322' with the data protection MAC value 321 and the data protection MAC value 322 read from the host memory 22. If the data protection MAC values match each other, the CPU 12 treats the data A-1 and the data A-2 as correct data. If the data protection MAC values do not match each other, the electronic device 3 does not respond to a command from the host thereafter.

As described above, the controller 4 writes the data A to the first internal address of the HM_mapped area 17 and reads the data A from the first internal address.

The same applies to a case where the data B is written to the HM_mapped area 17 and a case where the data B is read from the HM_mapped area 17.

Figure 30:
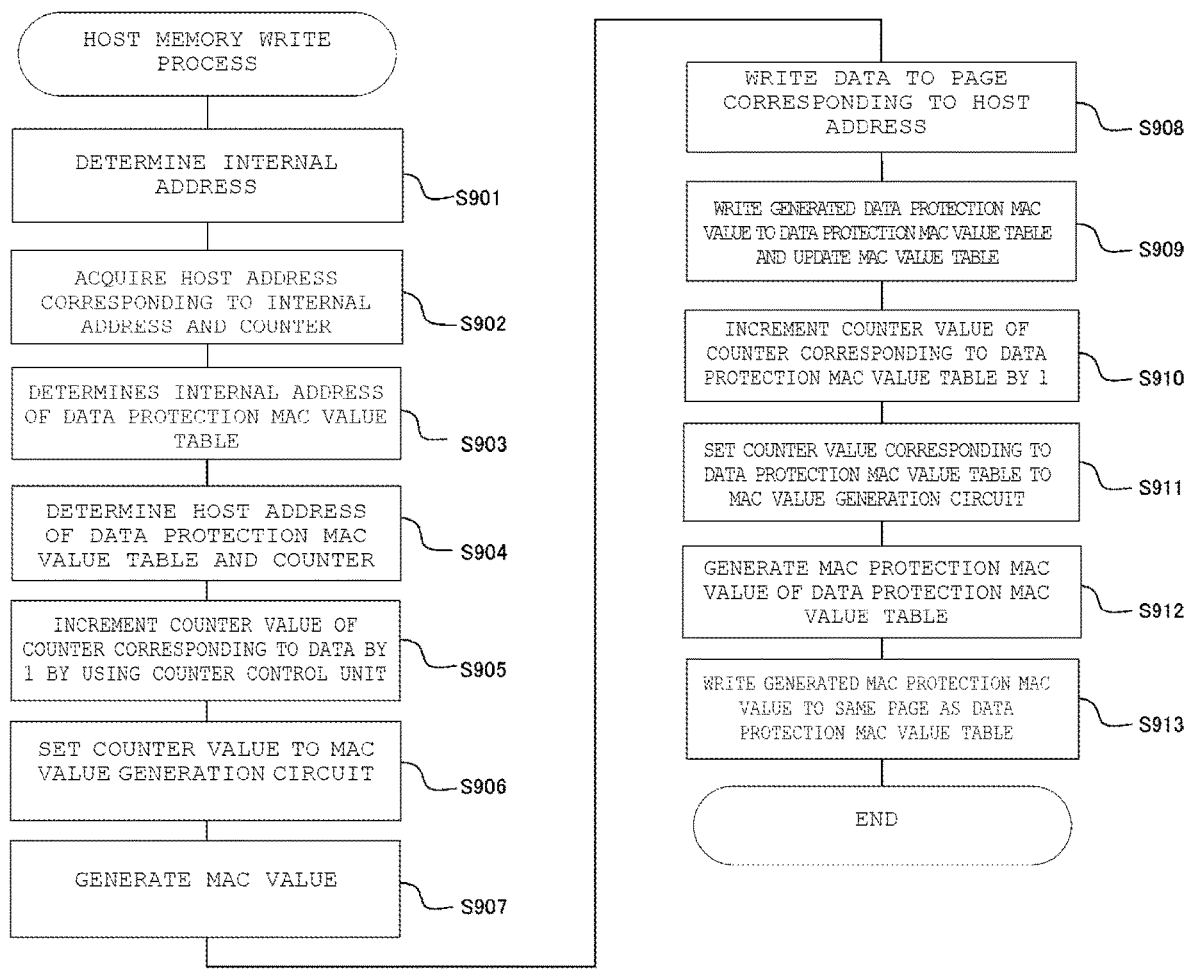
FIG. 30 is a flowchart of an example of a procedure of a host memory write process performed by the electronic device according to the second embodiment.

A flowchart of FIG. 30 illustrates an example of a procedure of a host memory write process performed by the controller 4. Since a procedure of step S901 of the host memory write process is the same as the procedure of step S31 of the host memory write process described above with reference to FIG. 7, description thereof is omitted.

The controller 4 acquires a host address corresponding to the internal address and a counter corresponding to the internal address by using the host memory address conversion table 151 (step S902). The controller 4 determines an internal address for storing a data protection MAC value (step S903). The host memory address translator 15 determines a host address corresponding to the data protection MAC value table 222 and a counter from the entries of the host memory address conversion table 151 (step S904). The counter control unit 124 increments a counter value of the counter corresponding to data to be written by 1 (step S905). The counter control unit 124 sets the counter value of the counter incremented by 1 to the MAC value generation circuit 16 (step S906). The MAC value generation circuit 16 generates a data protection MAC value based on the data to be written and the counter value (step S907). The CPU 12 transmits the host address, the data, and the data protection MAC value determined in step S903 to the host I/F 11, and the data is written to a page corresponding to the host address (step S908). The generated data protection MAC value is written to the page corresponding to the host address determined in step S903, and the data protection MAC value table 222 is updated (step S909). If the data protection MAC value table 222 is updated, the counter control unit 124 increments a counter corresponding to the data protection MAC value table 222 by 1 (step S910). The counter control unit 124 sets the counter value of the counter incremented by 1 to the MAC value generation circuit 16 (step S911). The MAC value generation circuit 16 generates a MAC protection MAC value based on the data of the data protection MAC value table 222 and the set counter value (step S912). The host memory address translator 15 transmits the host address of the data protection MAC value table 222 to the CPU 12. The CPU 12 transmits the MAC protection MAC value to the host I/F 11 and writes the generated MAC protection MAC value to the same page as the data protection MAC value table 222 (step S913).

Figure 31:
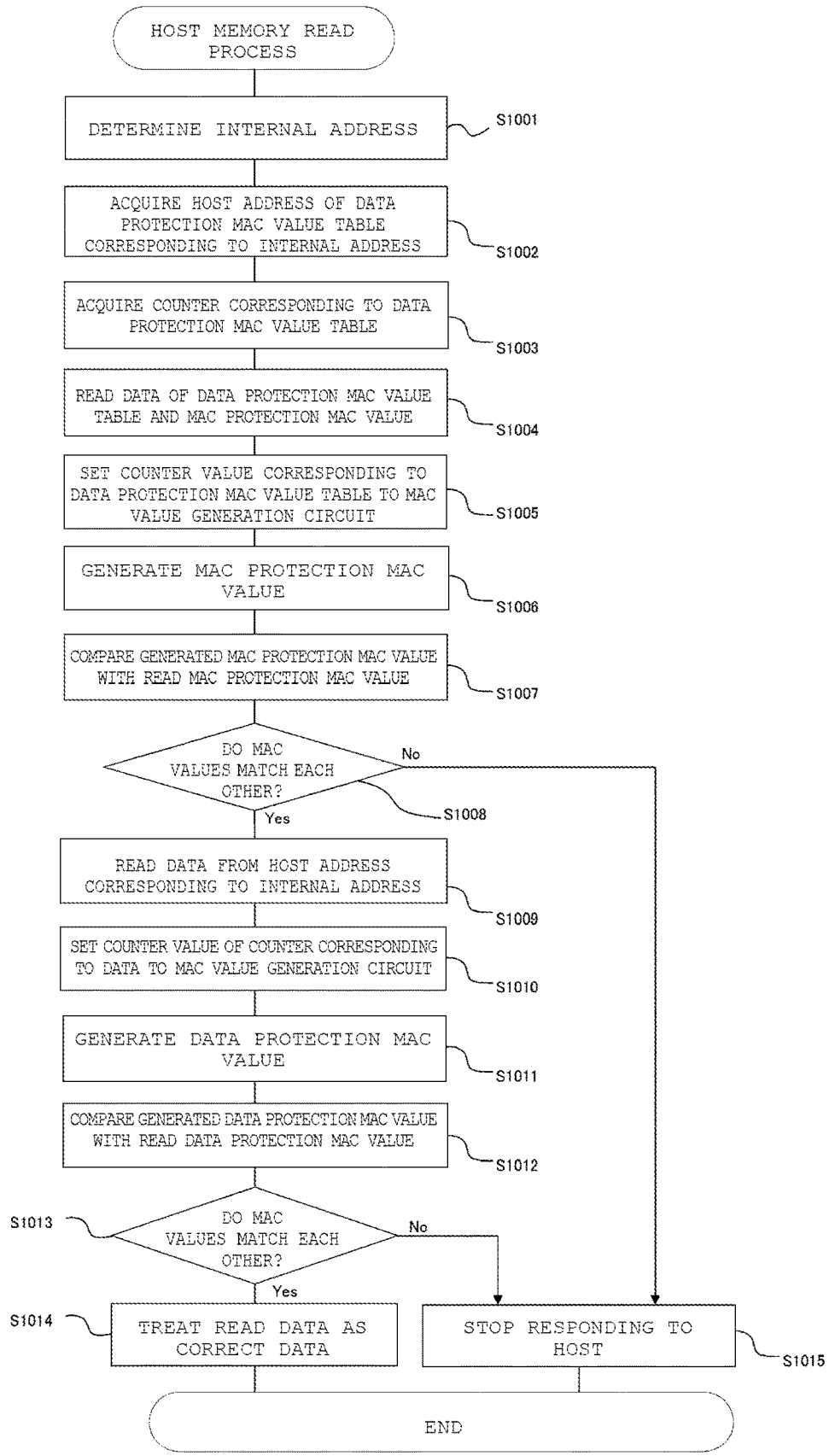
FIG. 31 is a flowchart of an example of a procedure of a host memory read process performed by the electronic device according to the second embodiment.

A flowchart of FIG. 31 illustrates an example of a procedure of a host memory read process performed by the controller 4. Since a procedure of step S1001 of the host memory read process is the same as the procedure of step S41 of the host memory read process described above with reference to FIG. 8, description thereof is omitted.

The controller 4 acquires a host address of the data protection MAC value table 222 corresponding to the internal address by using the host memory address conversion table 151 (step S1002). The host memory address translator 15 acquires a counter corresponding to the data protection MAC value table 222 from entries of the host memory address conversion table 151 (step S1003). The controller 4 reads data of the data protection MAC value table 222 and a MAC protection MAC value from the host memory 22 (step S1004). The counter control unit 124 sets the counter value of the counter corresponding to the data protection MAC value table 222 to the MAC value generation circuit 16 (step S1005). The MAC value generation circuit 16 generates a MAC protection MAC value from the data of the data protection MAC value table 222 and the counter value (step S1006). The CPU 12 compares the generated MAC protection MAC value with the read MAC protection MAC value of the data protection MAC value table 222 (step S1007), and if the generated MAC protection MAC value and the read MAC protection MAC value do not match each other (step S1008_No), it is determined that the read data is not correct, and the electronic device 3 does not respond to an instruction of the host 2 (step S1015). If the generated MAC protection MAC value and the read MAC protection MAC value match each other (step S1008_Yes), it is determined that the read data is correct, and the controller 4 reads the data according to a host address corresponding to the internal address (step S1009). The counter control unit 124 read the counter value from the counter determined from the entries of the host memory address conversion table 151 and sets the counter value to the MAC value generation circuit 16 (step S1010). The MAC value generation circuit 16 generates a data protection MAC value based on the read data and the counter value (step S1011). The CPU 12 compares the generated data protection MAC value with the read data protection MAC value (step S1012), and if the generated data protection MAC value and the read data protection MAC value match each other (step S1013_Yes), the controller 4 treats the data as correct data (step S1014). If the generated data protection MAC value and the read data protection MAC value do not match each other (step S1013_No), the CPU 12 determines that the read data is not correct, and thereafter, the electronic device 3 does not respond to an instruction of the host (step S1015). As described above, integrity of data can be checked by a MAC value corresponding to an area from which the data is read.

The second embodiment may be implemented by combining the modification examples of the first embodiment, and for example, a plurality of counters having the same operation may correspond to a data protection MAC value table.

As described above, the electronic device 3 can perform management based on a MAC by using a counter value even when a size of data to be stored in the host memory 22 requires a plurality of MPS areas. Thereby, it is possible to enhance security when the host memory 22 is used.

Further, it is possible to check whether or not content of data requiring a plurality of MPS areas is correct only by verifying the data protection MAC value table 222, and to reduce time for managing data of the MAC.

Each of various functions described in the first and second embodiments may be implemented by a circuit. An example of the circuit includes a programmed processor such as a central processing unit (CPU). The processor performs each of the described functions by executing a computer program (instruction group) stored in a memory. The processor may be a microprocessor including an electric circuit. The example of the circuit also includes a digital signal processor (DSP), an application specific integrated circuit (ASIC), a microcontroller, a controller, and other electrical circuit components. Each of the components other than the CPU described in the embodiments may also be implemented by a circuit.

Various processes of the present embodiment can be realized by a computer program. Accordingly, the same effect as in the present embodiment can be easily realized only by installing and executing a computer program in a computer through a computer-readable storage medium in which the computer program is stored.

While certain embodiments have been described, these embodiments have been presented by way of example only, and are not intended to limit the scope of the disclosures. Indeed, the novel embodiments described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An electronic device comprising:
   a non-volatile memory;
   a controller that is electrically connected to the non-volatile memory and configured to access a memory of a host, the memory of the host including a plurality of management areas;
   at least one counter that is provided for each of the plurality of management areas and configured to increment a count value each time the controller stores data in the corresponding one of the plurality of management areas; and
   a circuit configured to generate a first value for checking integrity of the data for each of the plurality of management areas based on the count value and the data,
   wherein the controller is configured to:
     store the data and the first value associated with the data, in one of the plurality of management areas;
     store the count value of the counter corresponding to the one of the plurality of management areas, in the controller;
     not store the count value of the counter corresponding to the one of the plurality of managements areas, in the memory of the host; and
     generate a key from a second value obtained by randomizing the count value of the counter corresponding to each of the management areas, and the circuit is configured to calculate the first value based on the key and the data.

2. The electronic device according to claim 1, wherein the at least one counter comprises a plurality of counters, and
   the controller is configured to:
     allocate the plurality of counters for each of the plurality of management areas; and
     store the count values of the plurality of counters in the non-volatile memory.

3. The electronic device according to claim 1, wherein the controller is configured to:
   convert the count value of the counter corresponding to a first one of the management areas into a random number; and
   input the random number and data stored in the first one of the management areas to the circuit,
   wherein the circuit is configured to generate the first value for the first one of the management areas based on the random number and the data stored in the first one of the management areas.

4. The electronic device according to claim 1, wherein the first value is a message authentication code (MAC).

5. The electronic device according to claim 1, wherein the first value is a digital signature.

6. The electronic device according to claim 1, wherein the at least one counter comprises a plurality of counters, and
when the count values of the plurality of counters provided for the one of the plurality of management areas are not equal to each other, the controller:
obtains the largest value of the count values of the plurality of counters provided for the one of the plurality of management areas;
obtains a third value by incrementing the largest value by 1; and
sets the third value to all of the plurality of counters provided for the one of the plurality of management areas.

7. The electronic device according to claim 1, wherein the controller is further configured to store third data and a fourth value in a third one of the management areas, the fourth value is used for checking integrity of the third data,
when the controller reads the third data and the fourth value from the third one of the management areas, the circuit is further configured to generate a fifth value based on the third data and the count value of the counter corresponding to the third one of the management areas, and
the controller is further configured to compare the fourth value read from the third one of the management areas and the generated fifth value.

8. An electronic device comprising:
a non-volatile memory;
a controller that is electrically connected to the non-volatile memory and configured to access a memory of a host, the memory of the host including a plurality of management areas;
at least one counter that is provided for each of the plurality of management areas and configured to increment a count value each time the controller stores data in the corresponding one of the plurality of management areas; and
a circuit configured to generate a value for checking integrity of the data for each management area based on the count value and the data,
wherein the controller is configured to:
store the data and the value associated with the data in one of the plurality of management areas;
store the count value of the counter corresponding to the one of the plurality of management areas, in the controller;
not store the count value of the counter corresponding to the one of the plurality of management areas, in the memory of the host ¿ convert the count value of the counter corresponding to the first one of the management areas into a random number; and
input the random number and the second data to the circuit,
when the controller stores second data and third data which are divided from first data in a first one of the management areas and a second one of the management areas, respectively,
the circuit generates a first protection value for checking integrity of the second data and a second protection value for checking integrity of the third data, and the controller stores the first protection value and second protection value in a third one of the management areas,
the circuit generates a third protection value for checking integrity of the first protection value and integrity of the second protection value, and the controller stores the third protection value in the memory in correspondence with the first data,
the circuit generates the first protection value from the random number and the second data.

9. The electronic device according to claim 8, wherein the first through third protection values are each a message authentication code (MAC).

10. The electronic device according to claim 8, wherein the first through third protection values are each a digital signature.

11. The electronic device according to claim 8, wherein the controller is further configured to store fourth data and a fourth protection value in a fourth one of the management areas, the fourth protection value is used for checking integrity of the fourth data;
when the controller reads the fourth data and the fourth protection value from the fourth one of the management areas, the circuit is further configured to generate a fifth protection value based on the fourth data and the count value of the counter corresponding to the fourth one of the management areas, and
the controller is further configured to compare the fourth protection value read from the fourth one of the management areas and the generated fifth protection value.

12. A method, comprising:
accessing a memory of a host, the memory including a plurality of management areas;
managing a plurality of counters associated with each of the plurality of management areas;
respectively incrementing count values of the plurality of counters associated with each of the plurality of management areas, each time data is stored in the corresponding one of the plurality of management areas;
storing the data and a value associated with the data in one of the plurality of management areas, wherein the value, generated based on the count value of one of the plurality of counters and the data, is used for checking integrity of the data;
determining the count values of the plurality of counters provided for the one of the plurality of management areas are not equal to each other;
in response to determining that the count values are not equal to each other, obtaining the largest value of the count values of the plurality of counters provided for the one of the plurality of management areas, obtaining a first value by incrementing the largest value by 1, and setting the first value to all of the plurality of counters provided for the one of the plurality of management areas;
generating a key from a second value obtained by randomizing the count value of the one of the plurality of counters corresponding to the one of the plurality of management areas; and
calculating the value based on the key and the data.

13. The method of claim 12, wherein the value is a message authentication code (MAC).

14. The method of claim 12, wherein the value is a digital signature.

15. The method of claim 12, further comprising:
storing first data and a second value in a first one of the management areas, the second value is used for checking integrity of the first data;
reading the first data and the second value from the first one of the management areas;

generating a third value based on the first data and the count value of one of the plurality of counters corresponding to the first one of the management areas; and comparing the second value read from the first one of the management areas and the generated third value.

* * * * *